(12) United States Patent
Yamagiwa

(10) Patent No.: US 6,786,990 B1
(45) Date of Patent: Sep. 7, 2004

(54) METHOD OF MANUFACTURING SEALANT-CONTAINING TIRES, AND SEALANT-CONTAINING TIRE

(75) Inventor: Toshio Yamagiwa, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/623,481

(22) PCT Filed: Feb. 8, 1999

(86) PCT No.: PCT/JP99/00528

§ 371 (c)(1),
(2), (4) Date: Sep. 14, 2000

(87) PCT Pub. No.: WO99/47345

PCT Pub. Date: Sep. 23, 1999

(30) Foreign Application Priority Data

| Mar. 16, 1998 | (JP) | ............................................ | 10-065383 |
| Jul. 22, 1998 | (JP) | ............................................ | 10-206471 |
| Dec. 24, 1998 | (JP) | ............................................ | 10-366252 |

(51) Int. Cl.$^7$ .............................. B60C 5/00; B60C 5/14; B60C 19/12; B60C 9/00
(52) U.S. Cl. ....................... 156/115; 152/502; 152/503; 152/506; 152/510
(58) Field of Search ................................ 152/502, 503, 152/506, 510; 156/110.1, 115, 118, 123

(56) References Cited

U.S. PATENT DOCUMENTS 3,096,202 A * 7/1963 von Arx ............... 428/355 CN

FOREIGN PATENT DOCUMENTS

| EP | 1 034 916 A1 | 11/1998 |
| EP | 1 060 870 A2 | 12/2000 |
| GB | 1019321 | 2/1966 |
| JP | 56-63414 | 5/1981 |
| JP | 8-323874 | 12/1996 |
| JP | 8-323875 | 12/1996 |
| JP | 09155881 | * 6/1997 |
| WO | WO 88/06539 | 9/1988 |

* cited by examiner

*Primary Examiner*—Jeff H. Aftergut
*Assistant Examiner*—Justin Fischer
(74) *Attorney, Agent, or Firm*—Arent Fox PLLC

(57) ABSTRACT

A green tire (24) prepared by superposing an inner liner (2) onto the inner surface of a tire body (1) is set in an upper die (29) and a lower die (30). In this condition, a pressure bag (31) placed inside the green tire (24) is expanded by air pressure to perform vulcanization and forming. At this time, a mold release sheet (9) such as a fluoro resin sheet having a mold releasing property on one surface only is interposed between a part of the inner liner (2) and the tire body (1) in such a manner that the surface having the mold releasing property is opposed to the inner liner (2). Accordingly, the inner liner (2) is prevented from being bonded by vulcanization to the tire body (1), thereby forming a sealant chamber having a proper shape for charging a sealant thereto. In case the mold release sheet (9) is formed of a material soluble in the sealant, a reduction in sealability of the sealant due to the mold release sheet (9) left in the sealant chamber can be avoided.

3 Claims, 20 Drawing Sheets

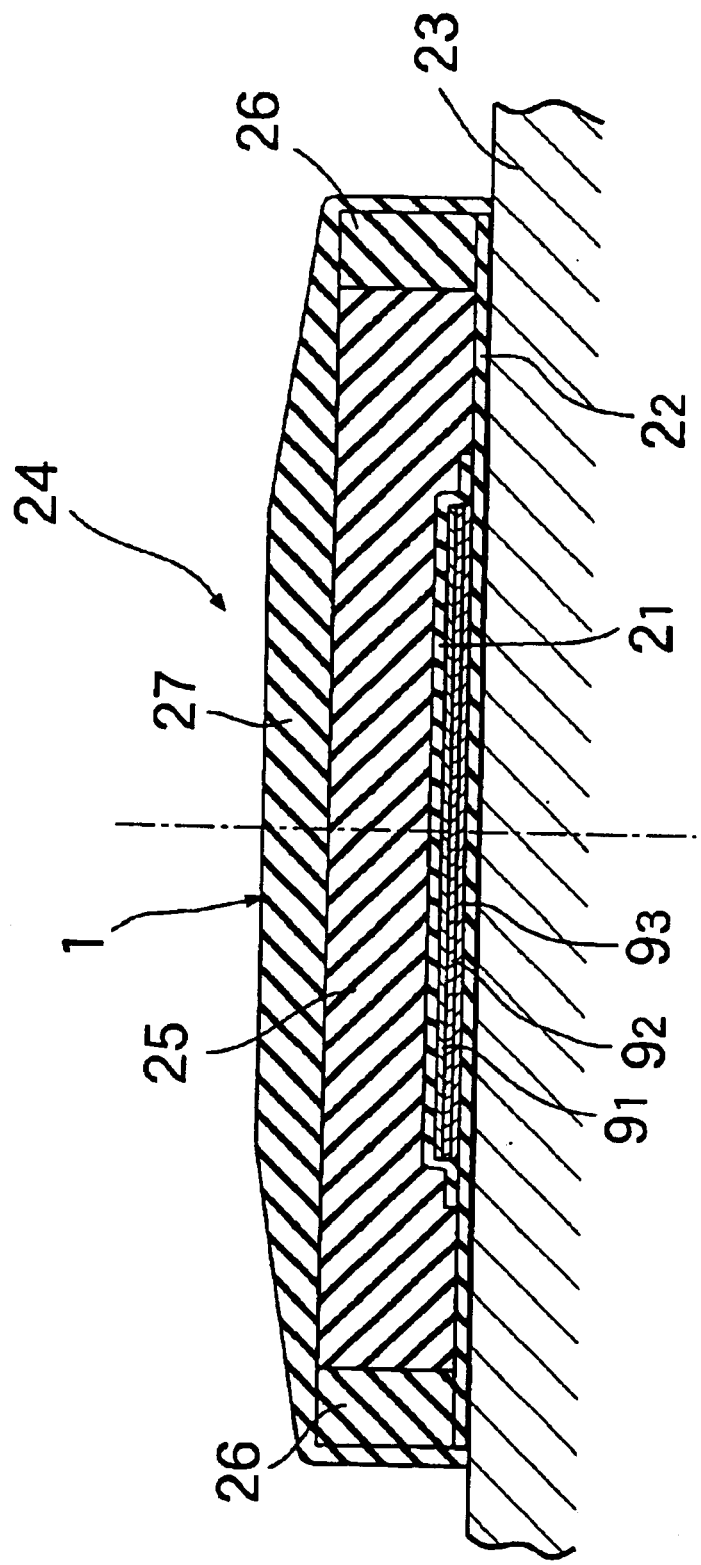

US 6,786,990 B1

METHOD OF MANUFACTURING SEALANT-CONTAINING TIRES, AND SEALANT-CONTAINING TIRE

FIELD OF THE INVENTION

The present invention relates to a manufacturing method for a sealant-incorporated tire having an annular sealant chamber defined by an inner liner inside a tread, and relates also to a sealant-incorporated tire manufactured by this method.

PRIOR ART

A sealant-incorporated tire is known from Japanese Patent Application Laid-open No. 8-323875, for example. This sealant-incorporated tire has a sealant chamber at least a part of which is defined by an inner liner inside a tread of a tire body. The sealant chamber is filled with a sealant for sealing a puncture formed through the tread by a nail or the like to thereby delay air leakage from the puncture.

In manufacturing the above conventional sealant-incorporated tire, the inner liner is superposed onto the tire body prior to vulcanization. At this time, a mold release agent such as talc is preliminarily applied to a part of the contact surfaces of the inner liner and the tire body or to a part of the contact surfaces of inner liner elements forming the inner liner. In this condition, vulcanization is performed to integrate the inner liner with the tire body and form the sealant chamber by leaving the portion to which the mold release agent is applied unbonded.

It should be noted here that in performing vulcanization by inserting a green tire including a tire body and an inner liner into a heating die, the inner liner is expanded to produce an area where the density of talc as the mold release agent is high and an area where it is low. As a result, the boundary between a bonded portion and an unbonded portion of the inner liner in the vulcanization process is not clearly defined, so that there is a possibility that the shape of the resultant sealant chamber may become imperfect. Accordingly, there is a problem that it is difficult to form a sealant chamber having a desired shape, and the degree of freedom in designing the shape of the sealant chamber is limited.

DISCLOSURE OF THE INVENTION

The present invention has been accomplished with the above circumstances in view, and it is an object of the present invention to clearly define the boundary between the bonded portion and the unbonded portion of the inner liner in vulcanizing the green tire, thereby forming a sealant chamber having a proper shape.

To accomplish the above-described object, according to a first aspect and feature of the present invention, there is provided a sealant-incorporated tire manufacturing method comprising the steps of superposing an inner liner onto an inner surface of a tire body prior to vulcanization and bonding at least a part of the inner liner to the inner surface of the tire body by vulcanization to define an annular sealant chamber by the inner liner inside a tread of the tire body, in which mold release sheet having a mold releasing property is placed on a portion of the inner liner facing to the sealant chamber prior to vulcanization.

With the above arrangement, the mold release sheet having the mold releasing property is placed on a portion of the inner liner facing to the sealant chamber in superposing the inner liner onto the inner surface of the tire body prior to vulcanization. Accordingly, this portion of the inner liner facing to the sealant chamber can reliably be prevented from being bonded by vulcanization to the inner surface of the tire body, and the remaining portion of the inner liner not facing to the sealant chamber can reliably be bonded by vulcanization to the inner surface of the tire body. As a result, the degree of freedom in designing the shape of the sealant chamber can be improved, and the sealant chamber can be formed into a proper shape.

According to a second aspect and feature of the present invention in addition to the above arrangement, there is provided a sealant-incorporated tire manufacturing method, wherein at least a part of one surface of the mold release sheet has the mold releasing property, and, in the vulcanization step, a part of the mold release sheet which has no mold releasing property is bonded to a wall surface of the sealant chamber by vulcanization.

With the above arrangement, the mold release sheet has a portion having the mold releasing property and a portion having no mold releasing property. The portion having the mold releasing property can prevent bonding of the inner liner to a part of the inner surface of the tire body by vulcanization to thereby form the sealant chamber. The portion having no mold releasing property allows the inner liner to be bonded to the wall surface of the sealant chamber by vulcanization to prevent random movement of the inner liner. Further, by setting the portion having the mold releasing property into a part of the one surface of the mold release sheet, the other part of the one surface can be used to bond the inner liner to the inner surface of the tire body by vulcanization, thereby stabilizing the shape of the sealant chamber.

According to a third aspect and feature of the present invention in addition to the first aspect and feature, there is provided a sealant-incorporated tire manufacturing method, in which the mold release sheet is formed of a material soluble in a sealant, so that the mold release sheet is dissolved into the sealant by injecting the sealant into the sealant chamber.

With the above arrangement, if the sealant is injected into the sealant chamber, the mold release sheet is dissolved into the sealant. Accordingly, a reduction in sealability of the sealant due to the presence of the mold release sheet in the sealant chamber can reliably be prevented.

According to a fourth aspect and feature of the present invention in addition to the third aspect and feature, there is provided a sealant-incorporated tire manufacturing method, in which the mold release sheet is formed of water-soluble paper or non-woven fabric.

With the above arrangement, the mold release sheet can reliably be dissolved into the sealant by injecting the sealant into the sealant chamber.

According to a fifth aspect and feature of the present invention in addition to the third aspect and feature, there is provided a sealant-incorporated tire manufacturing method, in which the mold release sheet is a film formed of a natural polysaccharide.

With the above arrangement, the mold release sheet can reliably be dissolved into the sealant by injecting the sealant into the sealant chamber.

According to a sixth aspect and feature of the present invention in addition to the first aspect and feature, there is provided a sealant-incorporated tire manufacturing method, in which a plurality of mold release sheets are laminated one on another.

With the above arrangement, even if the mold release sheets are expanded with the tire body and the inner liner in the vulcanization step, the contact surfaces of the plural mold release sheets mutually slide to thereby prevent breaking of the mold release sheets. Accordingly, undesired bonding of the tire body and the inner liner by vulcanization can reliably be avoided.

According to a seventh aspect and feature of the present invention in addition to the first aspect and feature, there is provided a sealant-incorporated tire manufacturing method, wherein the mold release sheet is folded into a corrugated shape prior to vulcanization, and the mold release sheet is expanded in the vulcanization step.

With the above arrangement, even if the mold release sheets are expanded with the tire body and the inner liner in the vulcanization step, the corrugated mold release sheet which is folded into a corrugated shape is freely expanded, so that it is prevented from being broken. Accordingly, undesired bonding of the tire body and the inner liner by vulcanization can reliably be avoided.

According to an eighth aspect and feature of the present invention, there is provided a sealant-incorporated tire which is manufactured by the sealant-incorporated tire manufacturing method according to any one of the first to seventh aspects and features.

With the above arrangement, it is possible to provide a high-quality sealant-incorporated tire having a sealant chamber proper in shape.

BRIEF DESCRIPTION OF THE DRAWINGS

FIGS. 1 to 5 show a first embodiment of the present invention, wherein FIG. 1 is a laterally sectional view of a motorcycle wheel mounted with a tire;

FIG. 2 is a first part of a flow diagram showing a manufacturing method for the tire;

FIG. 3 is a second part of the flow diagram;

FIG. 4 is an enlarged cross-sectional view taken along a line 4—4 in FIG. 2;

FIG. 5 is an enlarged cross-sectional view taken along a line 5—5 in FIG. 3;

FIG. 10 is a sectional view similar to FIG. 4, according to a fourth embodiment of the present invention;

FIGS. 13 to 19 show a first method of forming a sealant chamber by using a liquid mold release agent, wherein FIG. 13 is a laterally sectional view of a motorcycle wheel mounted with a tire manufactured by the first method;

FIG. 14 is a first part of a flow diagram showing a manufacturing method for the tire;

FIG. 15 is a second part of the flow diagram;

FIG. 16 is an enlarged view taken in the direction of an arrow 16 in FIG. 14;

FIG. 17 is a view taken in the direction of a line 17—17 in FIG. 16;

FIG. 18 is an enlarged cross-sectional view taken along a line 18—18 in FIG. 14; and FIG. 19 is an enlarged cross-sectional view taken along a line 19—19 in FIG. 15.

BEST MODE FOR CARRYING OUT THE INVENTION

Hereinafter, a first embodiment of the present invention will be described with reference to FIGS. 1 to 5.

Figure 1:
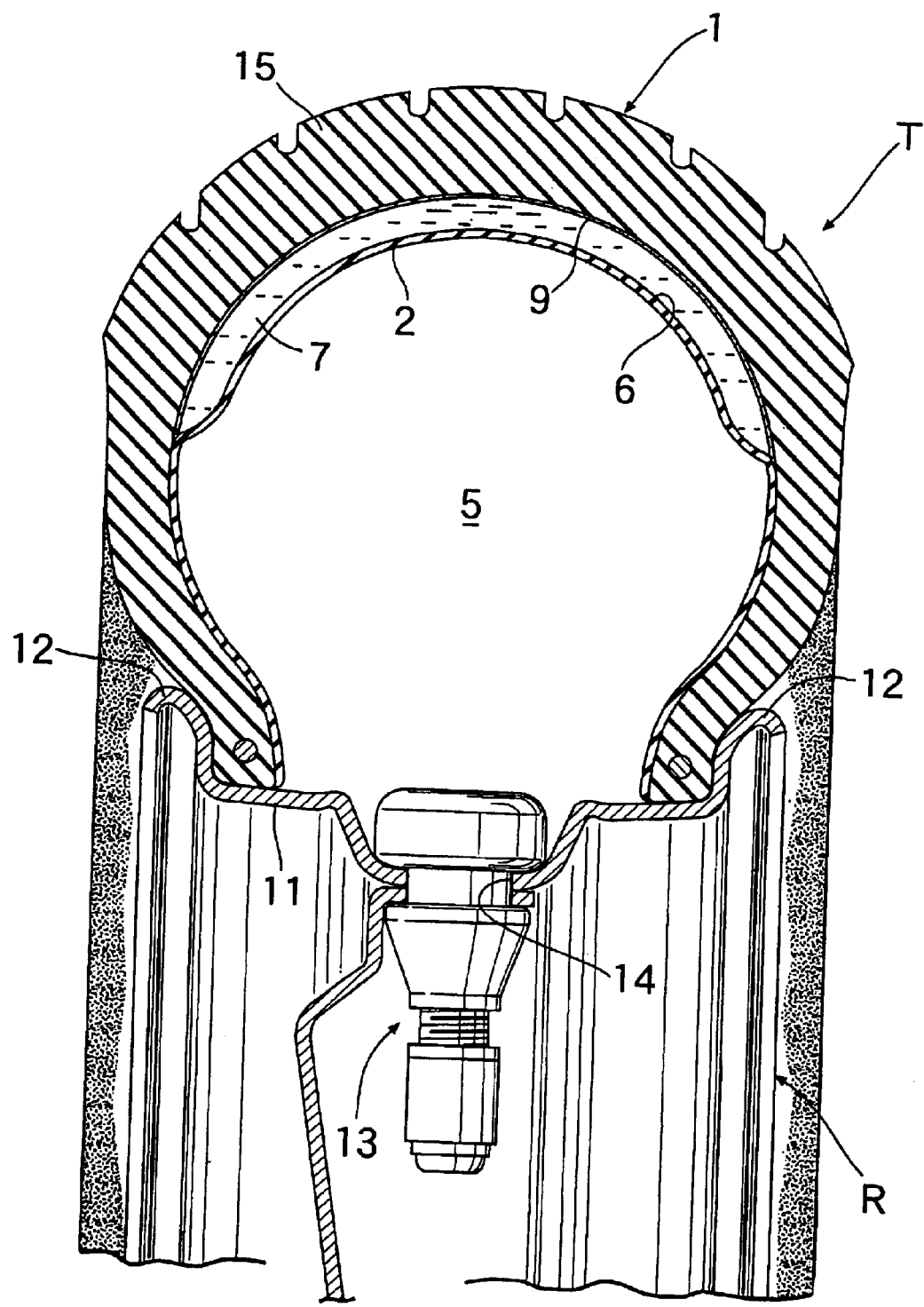

As shown in FIG. 1, mounted on a rim R of a motorcycle wheel is a tubeless tire T including a tire body 1 and an inner liner 2 bonded to an inner portion of the tire body 1 by vulcanization. The inner liner 2 is bonded by vulcanization at its right and left side portions except its central portion to an inner surface of the tire body 1, so that an air chamber 5 having a substantially circular shape in section is defined inside the inner liner 2, and a sealant chamber 6 having a substantially circular shape in section is defined between a non-bonded portion of the inner liner 2 and the inner surface of the tire body 1. The sealant chamber 6 is filled with a known liquid sealant 7.

The rim R includes an annular rim body 11 extending in the circumferential direction of the tire T and a pair of flanges 12, 12 extending radially outward from the laterally opposite ends of the rim body 11 to hold the inner circumference of the tire body 1. An air valve 13 for charging air into the air chamber 5 defined inside the inner liner 2 is supported through an air valve mounting portion 14 formed in one portion in the circumferential direction of the rim body 11.

The sealant chamber 6 defined between the inner liner 2 and the tire body 1 is maintained in a shape along an inner circumference of a tread 15 by air pressure in the air chamber 5. Accordingly, even when the tire body 1 is punctured by a nail or the like in the radial direction of the tire T or from a side portion of the tread 15, a puncture formed through the tire body 1 is immediately filled and mended with the sealant 7, thereby delaying air leakage from the air chamber 5 through the puncture. Further, since the sealant 7 is kept contained in the sealant chamber 6 and does not enter the air chamber 5, there is no possibility that the air valve 13 or a pressure gauge and the like put to the air valve 13 may be clogged with the sealant 7.

Figure 2:
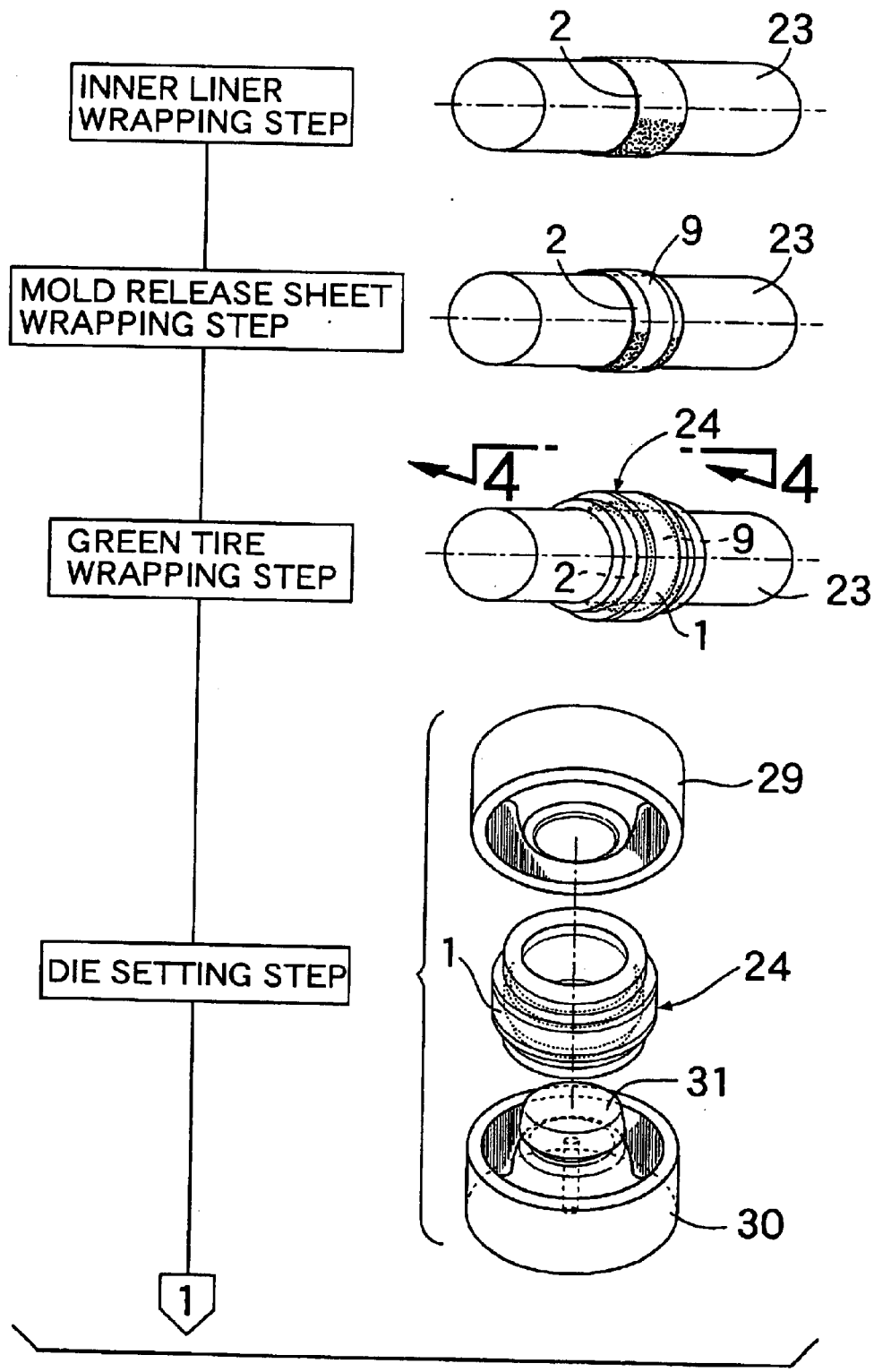
Figure 3:
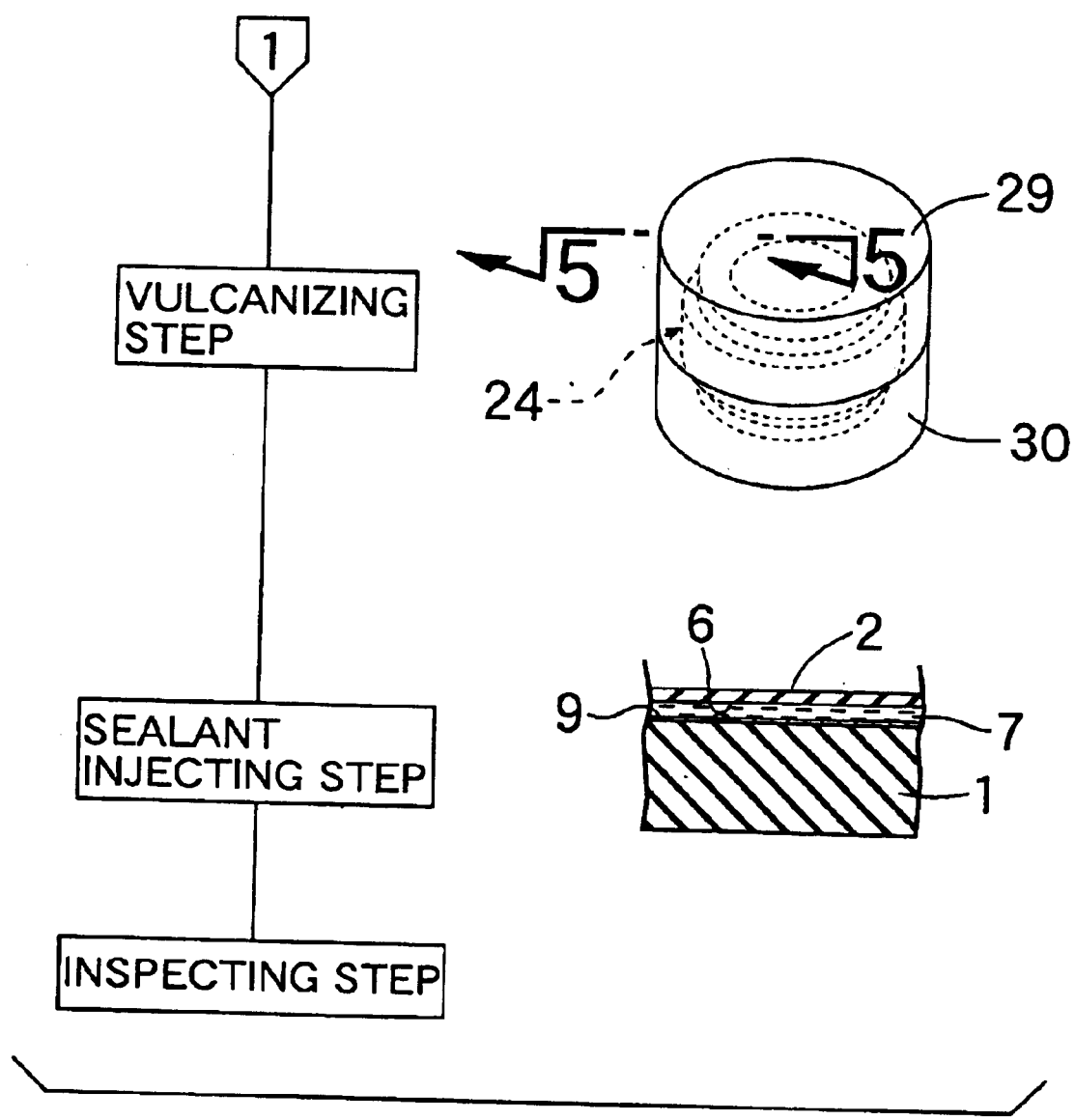

A manufacturing method for the tire T will now be described with reference to FIGS. 2 and 3.

The manufacturing method for the tire T includes an inner liner wrapping step, mold release sheet wrapping step, green tire wrapping step, die setting step, vulcanizing step, sealant injecting step, and inspecting step.

In the inner liner wrapping step, the cylindrical inner liner 2 of raw rubber is fitted around the outer circumference of a drum 23. In the subsequent mold release sheet wrapping step, a mold release sheet 9 is wrapped around the outer circumference of the inner liner 2. In the green tire wrapping step, each component of the tire body 1 is wrapped around the outer circumferences of the inner liner 2 and the mold release sheet 9 to form a green tire 24.

Figure 4:
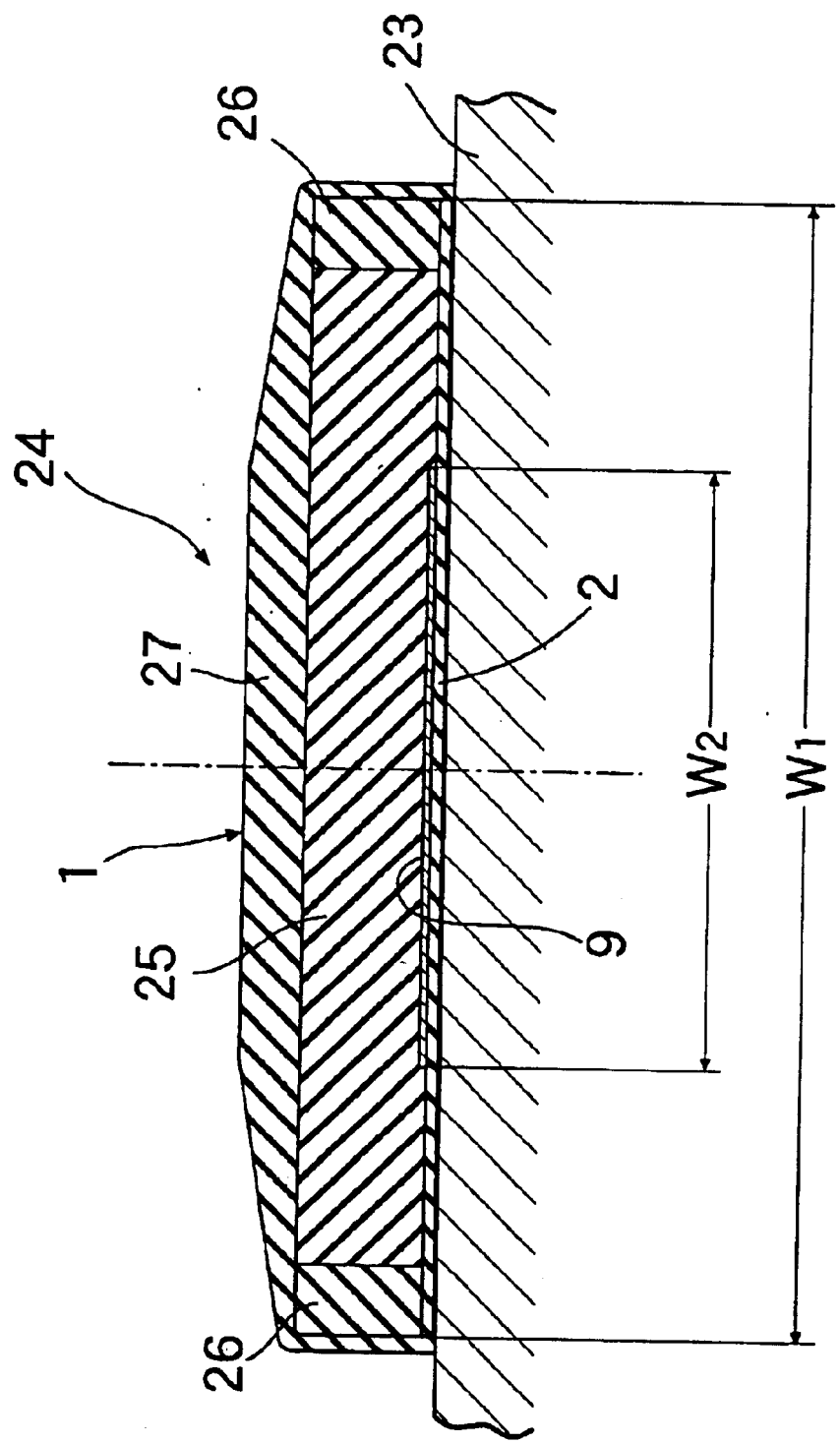

FIG. 4 shows a lateral cross section of the green tire 24 wrapped around the drum 23. The inner liner 2 forming the innermost layer of the green tire 24 has a width $W_1$, and the mold release sheet 9 stacked on the outer surface of the inner liner 2 has a width $W_2$ smaller than the width $W_1$ of the inner liner 2. Accordingly, the inner liner 2 partially projects from the opposite side edges of the mold release sheet 9. The mold release sheet 9 is formed from a fluoro resin sheet (e.g., Teflon sheet) or a silicone resin sheet having a thickness of 50 μm or less, which are commercially available. For example, Aflex (trade name) manufactured by Asahi Glass Co., Ltd. may be used as the Teflon sheet.

One surface of the mold release sheet 9 is preliminarily subjected to corona discharge treatment or CS treatment, so as to eliminate surface lubrication and thereby enhance adhesion to rubber. This treated surface of the mold release sheet 9 is brought into contact with the tire body 1, and the other untreated surface having the mold releasing property is brought into contact with the inner liner 2.

The corona discharge treatment is performed by generating high-voltage corona discharge between an electrode connected to a high-voltage generator and a metal roll of which surface is coated with polyester, Hypalon, EP rubber, etc. while passing the mold release sheet 9 as a subject to be treated along the metal roll to thereby make ozone or nitrogen oxide that has created corona react with the exposed surface of the mold release sheet 9, thereby making this surface hydrophilic because of generation of resultant carbonyl groups or the like. The CS treatment is performed by carrying out plasma discharge treatment under vacuum instead of the corona discharge, and the function and effect similar to those of the corona discharge treatment can be obtained.

The tire body 1 of raw rubber is wrapped around the outer circumferences of the inner liner 2 and the mold release sheet 9 to form the green tire 24. The tire body 1 is comprised of a cord portion 25 wrapped around the radially outside of the inner liner 2 and the mold release sheet 9, a pair of bead portions 26, 26 fitted with the outer circumference of the inner liner 2 so as to be joined with axially opposite ends of the cord portion 25 and a tread portion 27 wrapped around the radial outside of the cord portion 25 and the bead portions 26, 26 so as to cover them.

Figure 5:
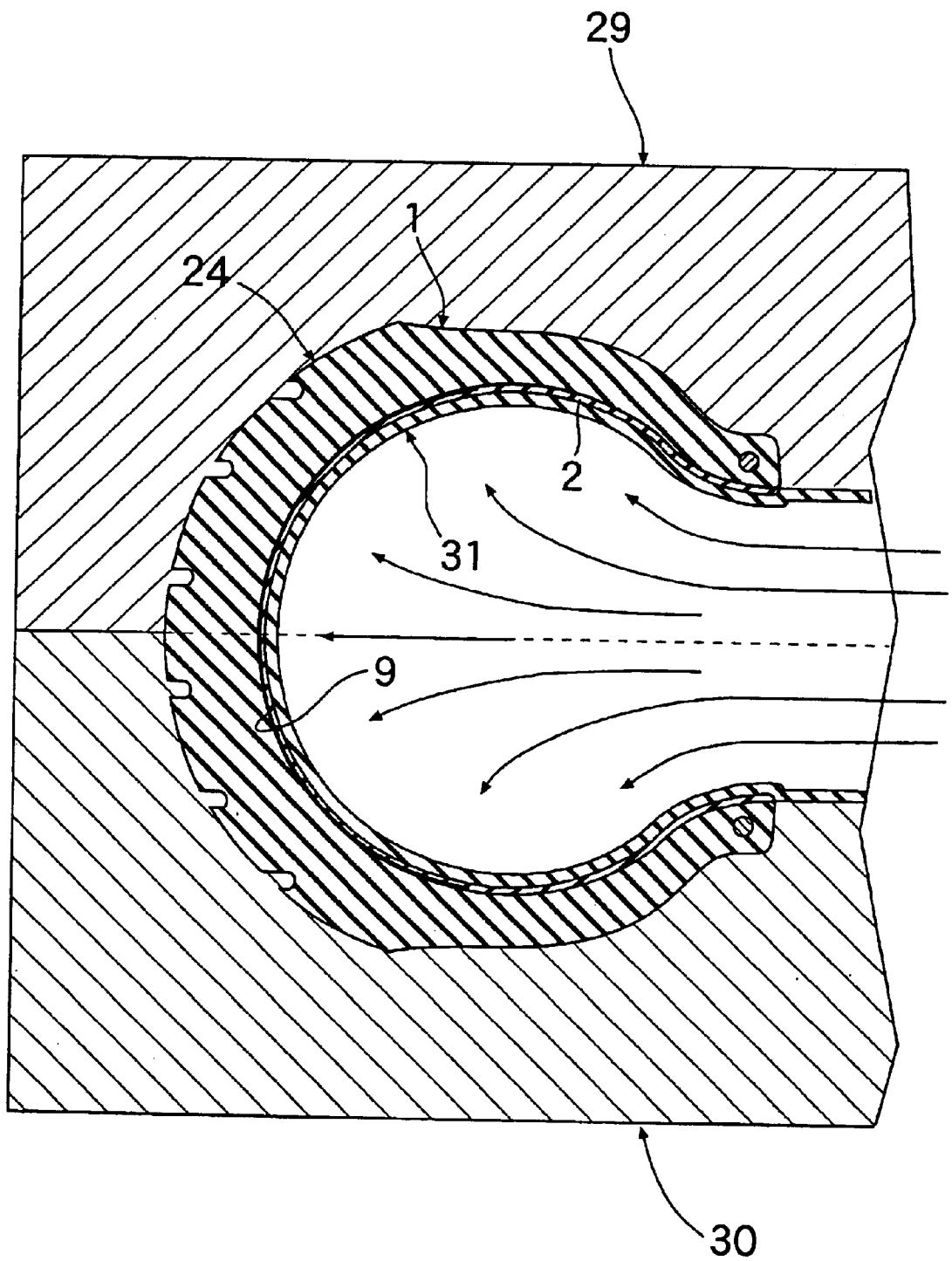

Subsequently, in the die setting step, the green tire 24 removed from the drum 23 is set between an upper die 29 and a lower die 30 for vulcanization and forming. Further, in the vulcanizing step as shown in FIG. 5, the upper die 29 and the lower die 30 are heated, and a pressure bag 31 placed inside the green tire 24 is expanded by air pressure to thereby bring the green tire 24 into pressure contact with the inner forming surfaces of the upper die 29 and the lower die 30, thus vulcanizing and forming the green tire 24 into a final product shape. By this vulcanization and forming, the inner liner 2 is integrated with the tire body 1.

At this time, the mold release sheet 9 is sandwiched and is compressed between the inner liner 2 and the tire body 1 by the pressure from the pressure bag 31 expanded. However, the other surface (i.e., the untreated surface) of the mold release sheet 9 abutting against the inner liner 2 is not bonded to the inner liner 2 by vulcanization, but the one surface (i.e., the treated surface) of the mold release sheet 9 abutting against the tire body 1 is bonded to the tire body 1 by vulcanization.

Thus, a portion of the inner liner 2 that must be bonded to the tire body 1 by vulcanizaiton can reliably be bonded by vulcanization, and a portion of the inner liner 2 that must not be bonded to the tire body 1 by vulcanization can reliably remain in the non-bonded state by using the mold release sheet 9, thereby forming the sealant chamber 6 having a proper shape between the inner liner 2 and the tire body 1. Furthermore, since the mold release sheet 9 is bonded and fixed to the inner surface of the tire body 1 by vulcanization, there is no possibility that the mold release sheet 9 may move in the sealant chamber 6 at randomn to hinder the free flow of the sealant 7, thereby reliably exhibiting a sealing effect by the sealant.

After the vulcanization and forming, the tire body 1 and the inner liner 2 integrated together are removed from the upper and lower dies. In the next sealant injecting step, the sealant 7 is injected into the sealant chamber 6 by using an injector or the like, thus completing the tire T. In the final inspecting step, the completed tire T is inspected to terminate all the steps.

A second embodiment of the present invention will now be described with reference to FIGS. 6 and 7.

Figure 6:
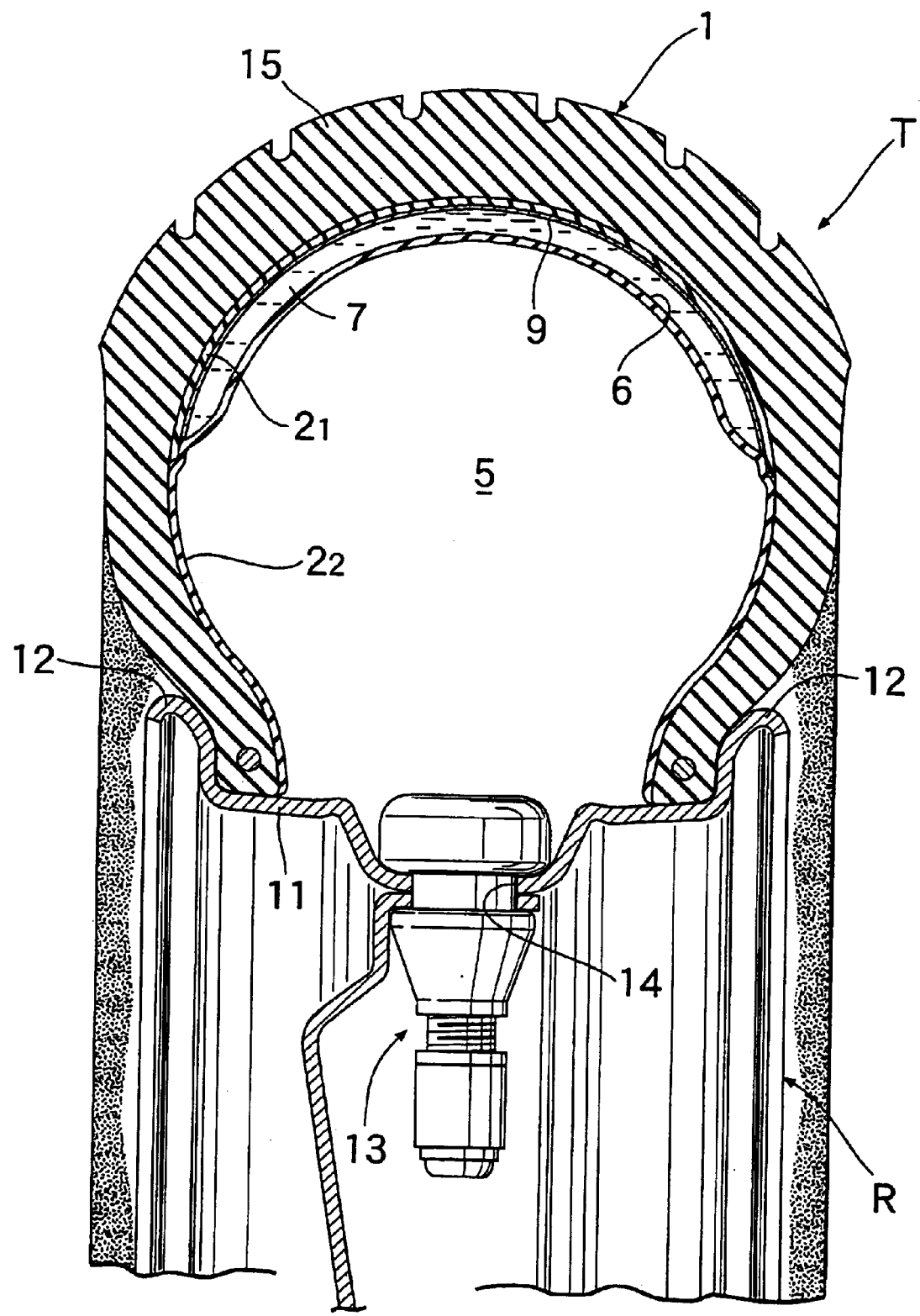
FIG. 6 is a laterally sectional view of a motorcycle wheel mounted with a tire according to a second embodiment of the present invention.

As shown in FIG. 6, a tire T according to the second embodiment includes a first inner liner $2_1$ bonded by vulcanization to a radially outside portion of an inner surface of a tire body 1, and a second inner liner 2. bonded by vulcanization to a radially inside portion of the inner surface of the tire body 1 and to right and left opposite end portions of the first inner liner $2_1$. A sealant chamber 6 is defined between the first inner liner $2_1$ and the second inner liner $2_2$. A mold release sheet 9 is fixed by vulcanization and bonding to a wall surface of the first inner liner $2_1$ facing to the sealant chamber 6.

Figure 7:
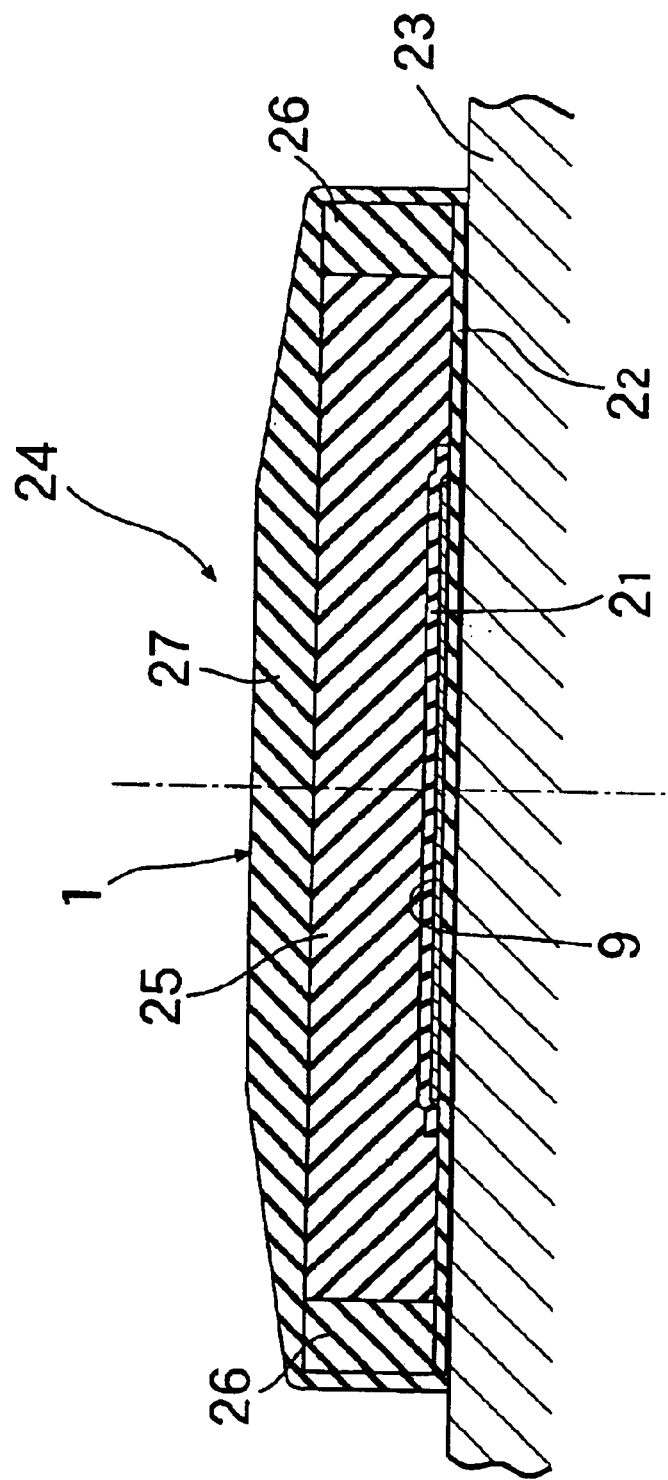
FIG. 7 is a sectional view similar to FIG. 4, according to the second embodiment.

FIG. 7 shows a green tire wrapping step for the tire T according to the second embodiment. A second inner liner $2_2$ is wrapped around an outer circumference of a drum 23, a mold release sheet 9 is wrapped around the outer circumference of the second inner liner $2_2$, and a first inner liner $2_1$ is wrapped around the mold release sheet 9. A surface of the mold release sheet 9 opposed to the first inner liner $2_1$ is preliminarily subjected to corona discharge treatment or CS treatment, and this treated surface of the mold release sheet 9 is bonded by vulcanization to the first inner liner $2_1$. A surface of the mold release sheet 9 opposed to the second inner liner $2_2$ exhibits its mold releasing property to define the sealant chamber 6. According to the second embodiment, the function and effect similar to those of the first embodiment can be obtained.

A third embodiment of the present invention will now be described with reference to FIGS. 8 and 9.

Figure 8:
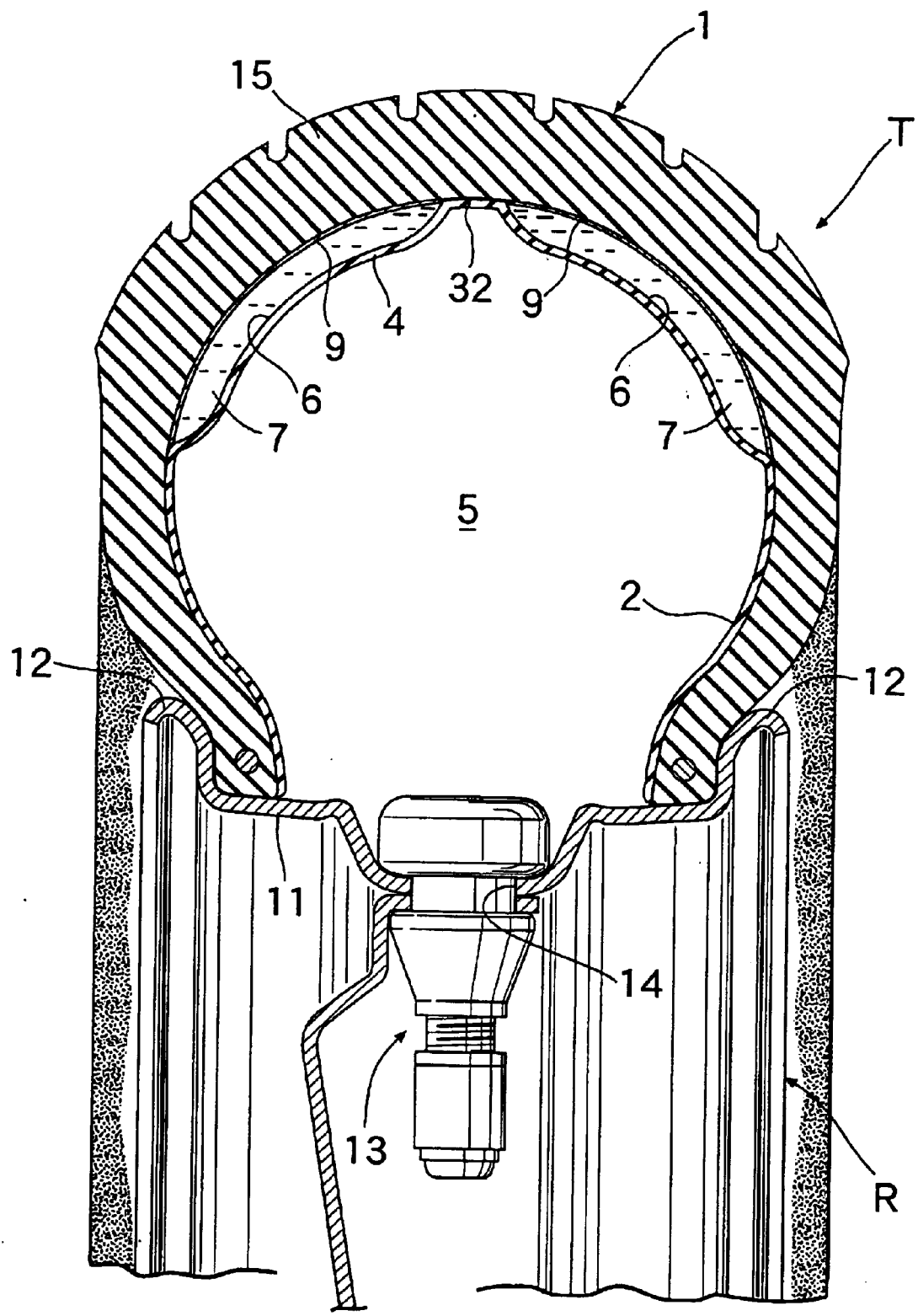
FIG. 8 is a laterally sectional view of a motorcycle wheel mounted with a tire according to a third embodiment of the present invention.

As shown in FIG. 8, a tire T according to the third embodiment includes a single inner liner 2 as similar to the tire T according to the first embodiment. The inner liner 2 is bonded by vulcanization at its opposite end portions to an inner surface of a tire body 1 as in the first embodiment. Additionally, the central portion of the inner liner 2 is also bonded by vulcanization to the inner surface of the tire body 1 over a given width (e.g., 5 mm). Accordingly, sealant chambers 6, 6 are separated into right and left chambers by a central bonded portion 32 of the inner liner 2, thereby stabilizing the shape of each of the sealant chambers 6, 6. Further, in the case that the tire T is large in size, movement of a sealant 7 charged in each of the sealant chambers 6, 6 can be minimized.

Figure 9:
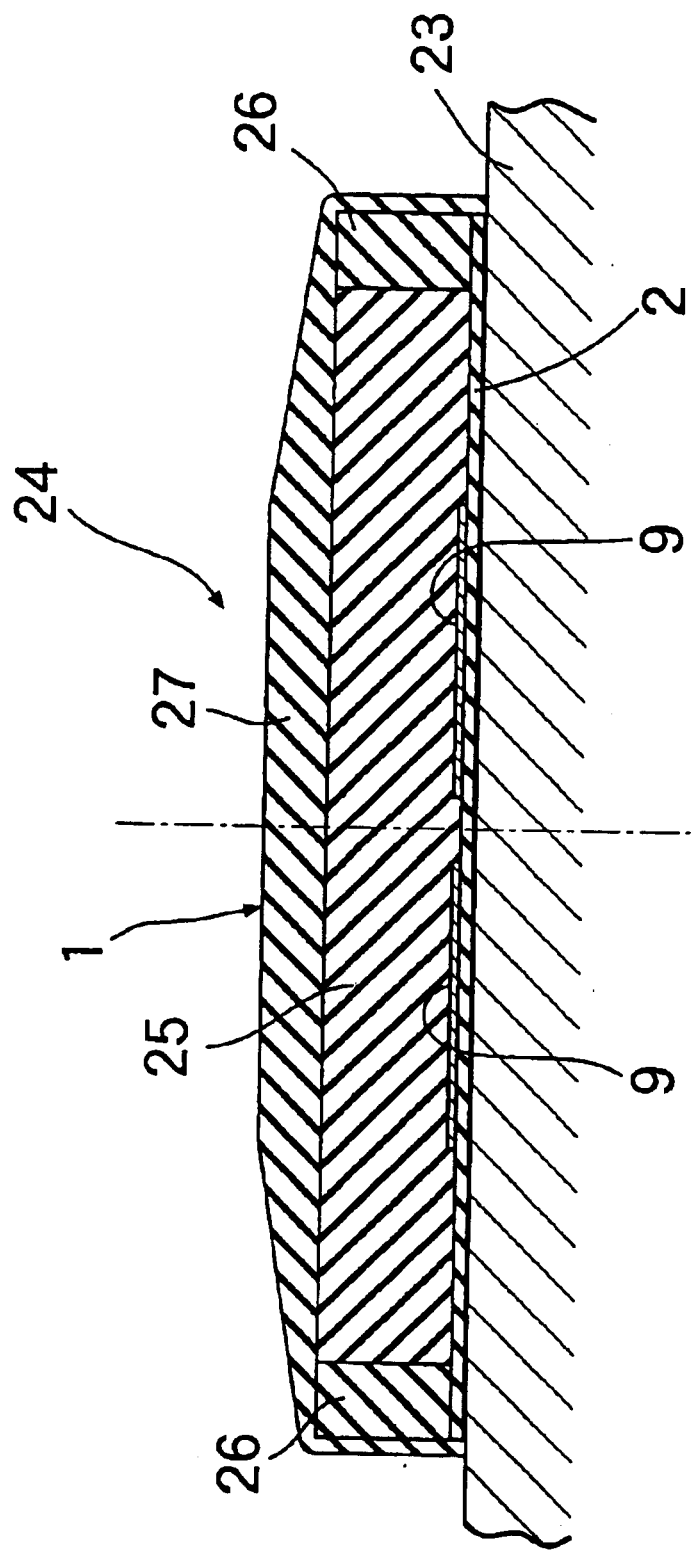
FIG. 9 is a sectional view similar to FIG. 4, according to the third embodiment.

FIG. 9 shows a green tire wrapping step for the tire T according to the third embodiment. The inner liner 2 is wrapped around an outer circumference of a drum 23, and two mold release sheets 9, 9 are wrapped around the outer circumference of the inner liner 2 so as to be spaced apart from each other by a distance of 5 mm. Further, each component of the tire body 1 is wrapped around the outer circumference of the inner liner 2, thus forming the green tire 24. A surface of each of the mold release sheets 9, 9 opposed to the inner liner 2 has a mold releasing property, and a surface of each of the mold release sheets 9, 9 opposed to the tire body 1 is preliminarily subjected to corona discharge treatment or CS treatment to lose its mold releasing property. Accordingly, each of the two separate sealant chambers 6, 6 can be formed into a proper shape.

Incidentally, while the two mold release sheets 9, 9 are laterally spaced apart from each other in manufacturing the tire T having the structure shown in FIG. 8 according to the third embodiment, a single mold release sheet 9 may be used by the following two methods to obtain a similar effect.

According to the first method, the entirety of the surface of the mold release sheet 9 opposed to the tire body 1 is preliminarily subjected to corona discharge treatment or CS treatment to eliminate its mold releasing property, and a part of the surface of the mold release sheet 9 opposed to the inner liner 2 is preliminarily subjected to corona discharge treatment or CS treatment to eliminate its mold releasing property. Accordingly, a part of the surface opposite to the surface of the mold release sheet 9 bonded to the tire body 1 is bonded to the inner liner 2, thereby obtaining the tire T having the structure as shown in FIG. 8. The part, of which mold releasing property is eliminated, of the surface of the mold release sheet 9 opposed to the liner 2 may be in the form of lines or spots.

According to the second method, the surface of the mold release sheet 9 opposed to the tire body 1 is preliminarily subjected to corona discharge treatment or CS treatment to eliminate its mold releasing property, and slits or spot openings are then formed through the mold release sheet 9. Accordingly, the inner liner 2 is brought into contact with the tire body 1 through the above slits or spot openings of the mold release sheet 9, and is bonded by vulcanization to the tire body 1, thereby obtaining the tire T having the structure as shown in FIG. 8.

Figure 11A:
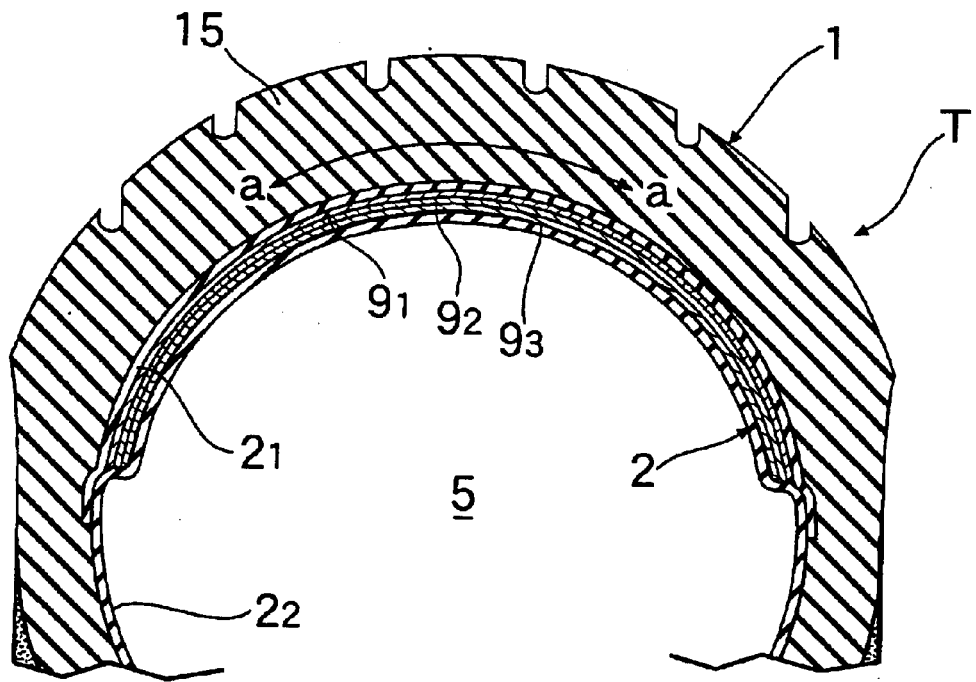
FIGS. 11A and 11B are sectional views respectively showing a condition where a tire vulcanizing step is finished and a condition where a sealant injecting step is finished, according to the fourth embodiment.

A fourth embodiment of the present invention will now be described with reference to FIGS. 10 and 11.

In contrast with the first to third embodiments each employing the single mold release sheet 9, according to the fourth embodiment, three mold release sheets $9_1$, $9_2$, and $9_3$ are positioned in a laminated state between a first inner liner $2_1$ and a second inner liner $2_2$ in the condition of a green tire 24, as shown in FIG. 10. Each of the three mold release sheets $9_1$, $9_2$, and $9_3$ is formed of a material soluble in a sealant 7 composed mainly of water and ethylene glycol. Examples of this material include water-soluble paper, non-woven fabric, edible film and the like. The edible film is a film formed mainly of carrageenan as a natural polysaccharide extracted from the seaweed, and this film is soluble in water, so that it is soluble in the sealant 7.

By laminating the three mold release sheets $9_1$, $9_2$, and $9_3$ one on another as described above, it is possible to avoid a break of these sheets $9_1$, $9_2$, and $9_3$ in a vulcanizing step wherein the green tire 24 is set between an upper die 29 and a lower die 30 and vulcanized while heating to be formed into a final product shape, thereby reliably preventing a possibility of bonding of the first inner liner $2_1$ and the second inner liner $2_2$ by vulcanization. More specifically, the mold release sheets $9_1$, $9_2$, and $9_3$ are expanded with the green tire 24 in opposite directions shown by arrows a—a in FIG. 11(A) in the vulcanizing step. At this time, the mold release sheets $9_1$, $9_2$, and $9_3$ slide mutually to be prevented from breaking, so that there is no possibility of direct contact of the first inner liner $2_1$ and the second inner liner $2_2$ in the broken portion. More preferably, talc is attached to opposite surfaces of the central mold release sheet $9_2$, thereby improving the mutual slide of the mold release sheets $9_1$, $9_2$, and $9_3$ to more reliably prevent the break.

Figure 11B:
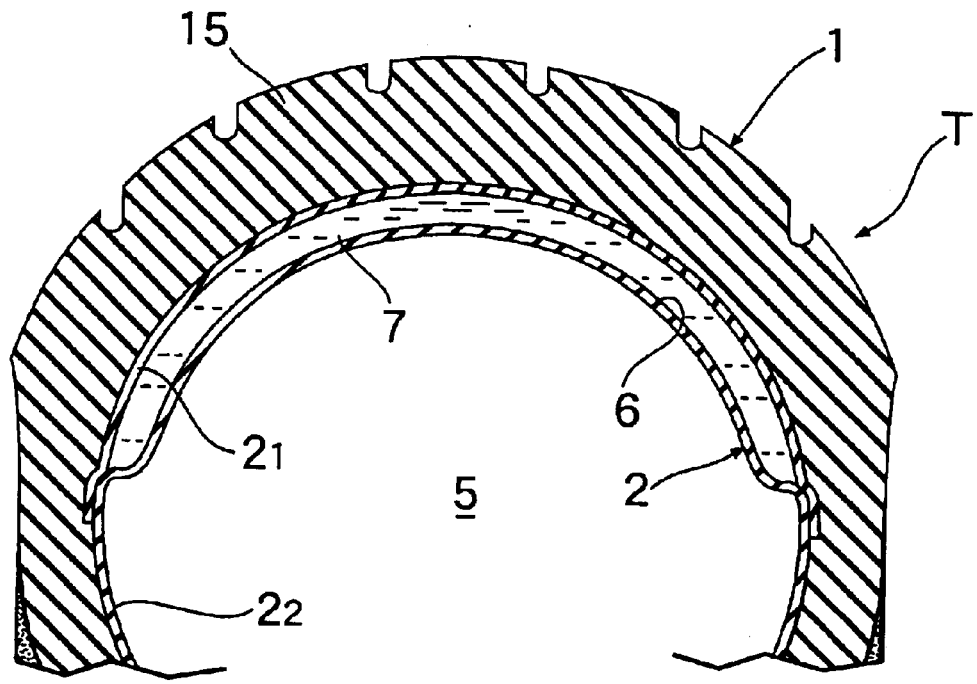

Thereafter, the sealant 7 is injected into the sealant chamber 6. Because the mold release sheets $9_1$, $9_2$, and $9_3$ remaining in the sealant chamber 6 are dissolved as shown in FIG. 11B, the sealability of the sealant 7 can reliably be prevented from being hindered by the remaining of the mold release sheets $9_1$, $9_2$, and $9_3$.

Figure 12:
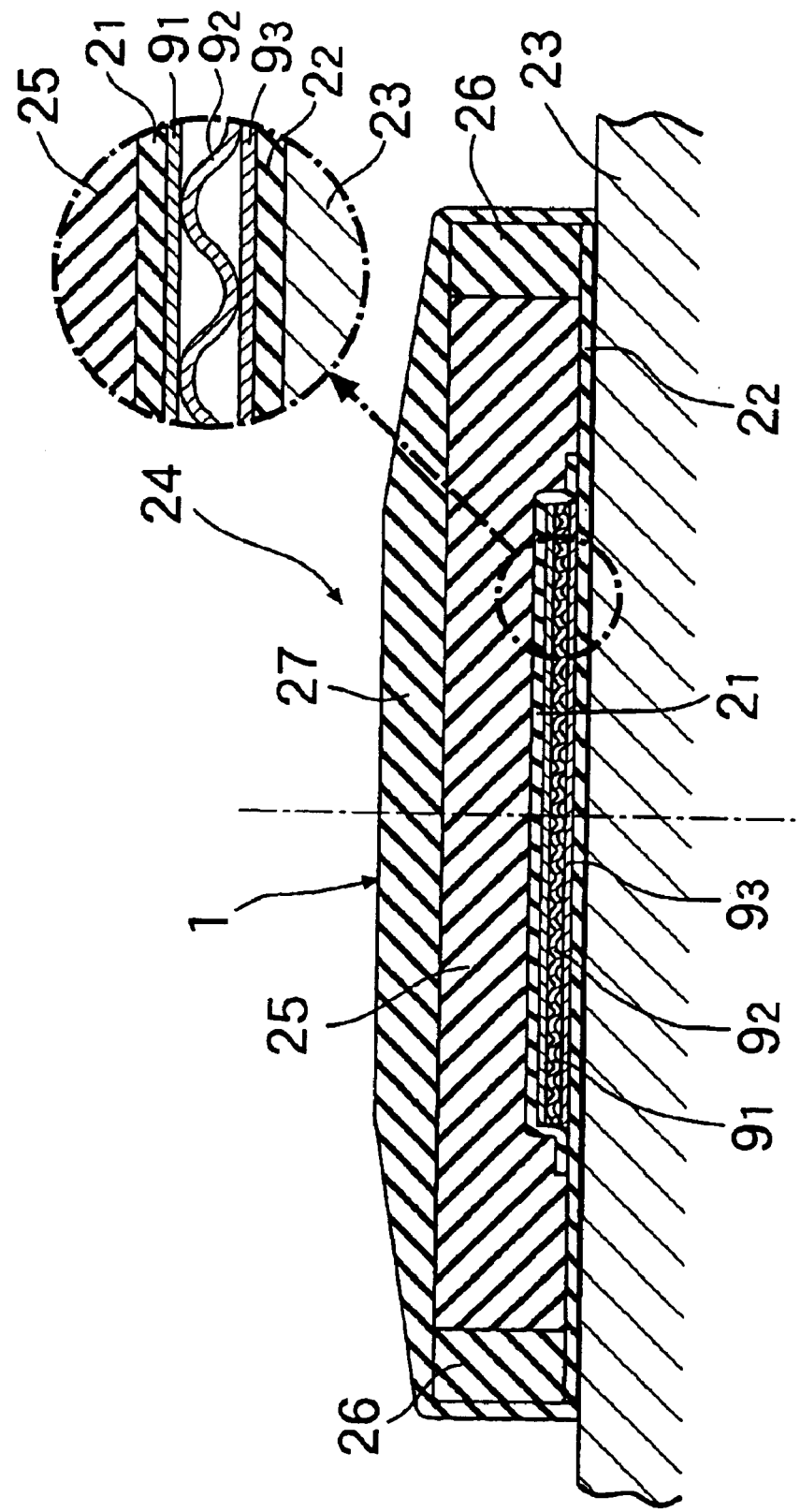
FIG. 12 is a sectional view similar to FIG. 4, according to a fifth embodiment of the present invention.

A fifth embodiment of the present invention will now be described with reference to FIG. 12.

The fifth embodiment is characterized in that one (e.g., the central mold release sheet $9_2$) of the three mold release sheets $9_1$, $9_2$, and $9_3$ used in the fourth embodiment is preliminarily formed into a corrugated shape. With this configuration, even if the upper and lower mold release sheets $9_1$ and $9_3$ are broken in the vulcanizing step wherein the green tire 24 and the three mold release sheets $9_1$, $9_2$, and $9_3$ are expanded so that the green tire 24 is formed into a final product shape, the corrugated mold release sheet $9_2$ is expanded to become linear and is prevented from being broken, thereby reliably preventing direct contact of the first inner liner $2_1$ and the second inner liner $2_2$ to prevent bonding of these inner liners $2_1$ and $2_2$ by vulcanization.

Having thus described the embodiments of the present invention, various design changes may be made without departing from the scope of the present invention.

For example, the mold release sheets 9, $9_1$, $9_2$, $9_3$ in each of the first to third and fifth embodiments may be formed of a material soluble in the sealant 7. Further, while the three mold release sheets $9_1$, $9_2$, and $9_3$ are laminated one on another in each of the fourth and fifth embodiments, two mold release sheets or four or more mold release sheets may be laminated one on another.

While the mold release sheets 9, $9_1$, $9_2$, and $9_3$ are used to form the sealant chamber 6 in the first to fifth embodiments, there will now be described some methods of forming a sealant chamber by using a liquid mold release agent instead of the mold release sheets 9, $9_1$, $9_2$, and $9_3$.

Hereinafter, a first method of forming a sealant chamber by using a liquid mold release agent will be described with reference to FIGS. 13 to 19.

Figure 13:
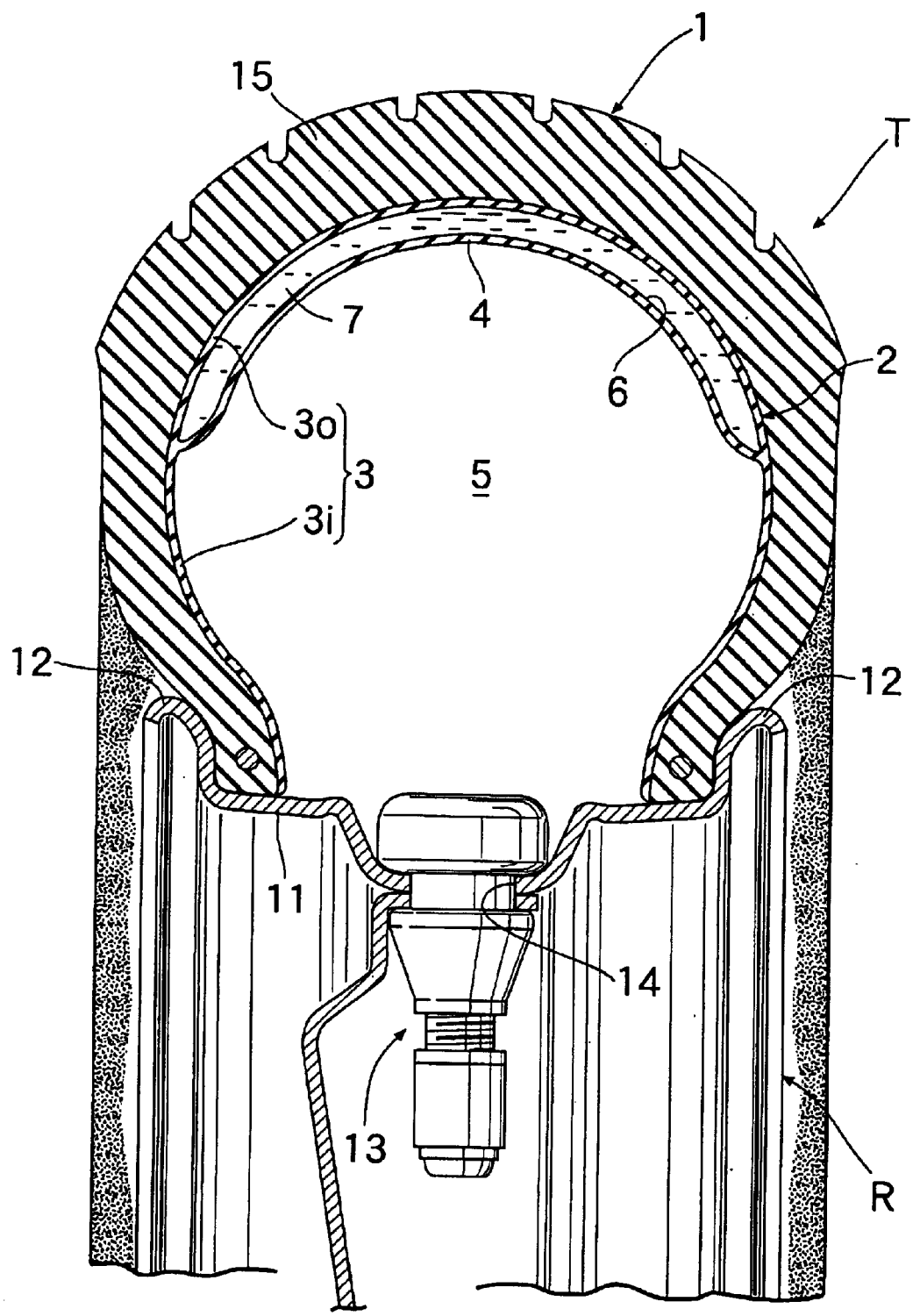

As shown in FIG. 13, mounted on a rim R of the motorcycle wheel is a tubeless tire T including a tire body 1 and an inner liner 2 bonded to an inner portion of the tire body 1 by vulcanization. The inner liner 2 includes a sectionally substantially U-shaped peripheral wall 3 which is comprised of air chamber peripheral walls 3i, 3i located in a radially inside portion of the tire T and a sealant chamber peripheral wall 3o located in a radially outside portion of the tire T. A pair of connections connecting the air chamber peripheral walls 3i, 3i and the sealant chamber peripheral wall 3o in the peripheral wall 3 are connected to each other by a partition wall 4 formed integrally with the connections.

Air is charged into a sectionally substantially circular air chamber 5 which is defined between the air chamber peripheral walls 3i, 3i and the partition wall 4. A known liquid sealant 7 is charged into a sectionally substantially arcuate sealant chamber 6 which is defined between the sealant chamber peripheral wall 3o and the partition wall 4.

The rim R includes an annular rim body 11 extending in the circumferential direction of the tire T and a pair of flanges 12 extending radially outward from the laterally opposite ends of the rim body 11 to hold the inner circumference of the tire body 1. An air valve 13 for charging air into the air chamber 5 defined inside the inner liner 2 is supported through an air valve mounting portion 14 formed through the rim body 11 at one circumferential position thereof.

The sealant chamber 6 of the inner liner 2 is maintained in a shape along an inner circumference of a tread 15 by air pressure in the air chamber 5. Accordingly, even when the tire body 1 is punctured by a nail or the like in the radial direction of the tire T or from a side portion of the tread 15, a puncture formed through the tire body 1 is immediately filled and mended with the sealant 7, thereby delaying air leakage from the air chamber 5 through the puncture. Further, since the sealant 7 is kept contained in the sealant chamber 6 and does not enter the air chamber 5, there is no possibility that the air valve 13 or a pressure gauge and the like put to the air valve 13 may be clogged with the sealant 7.

Figure 14:
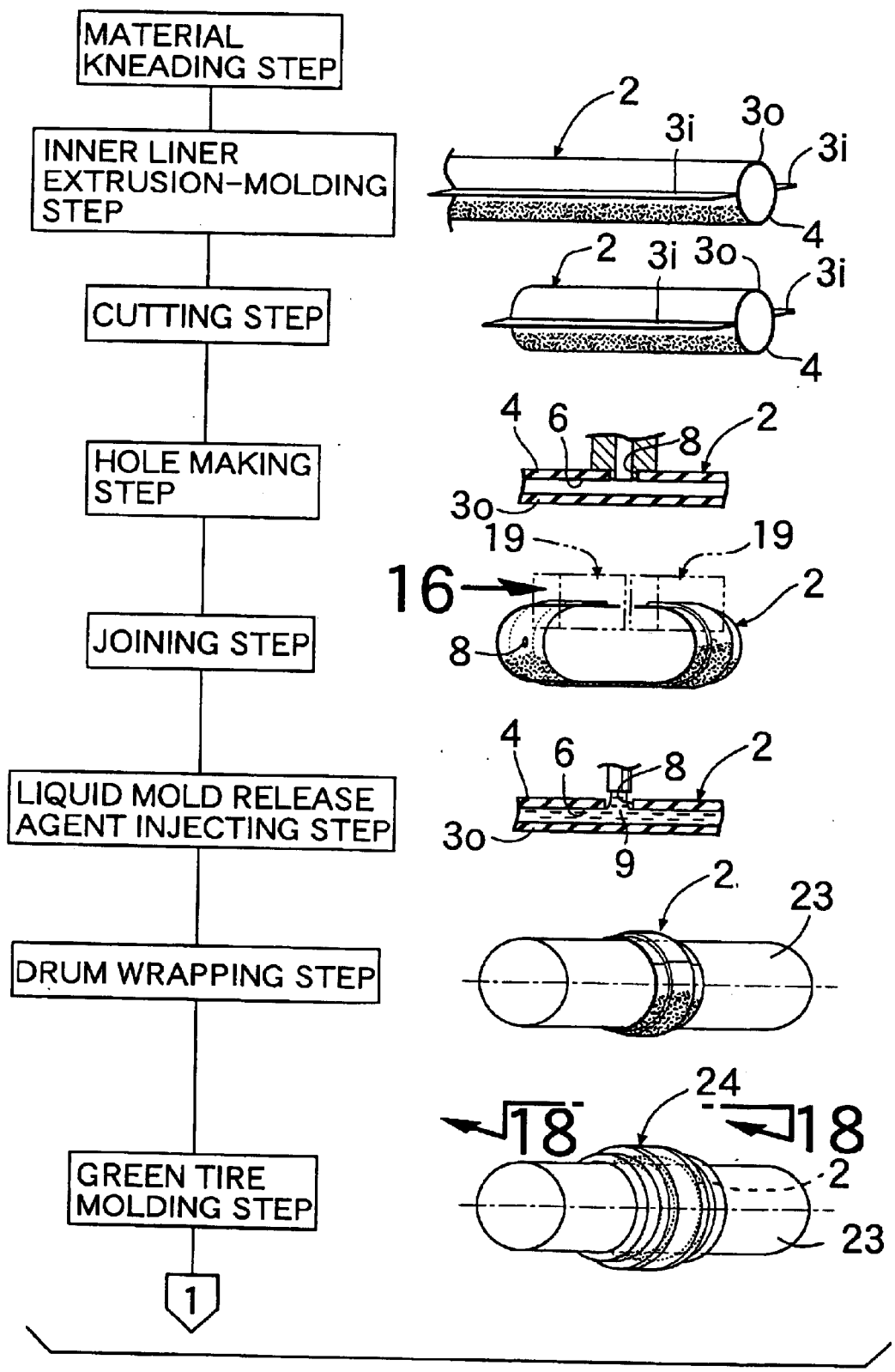
Figure 15:
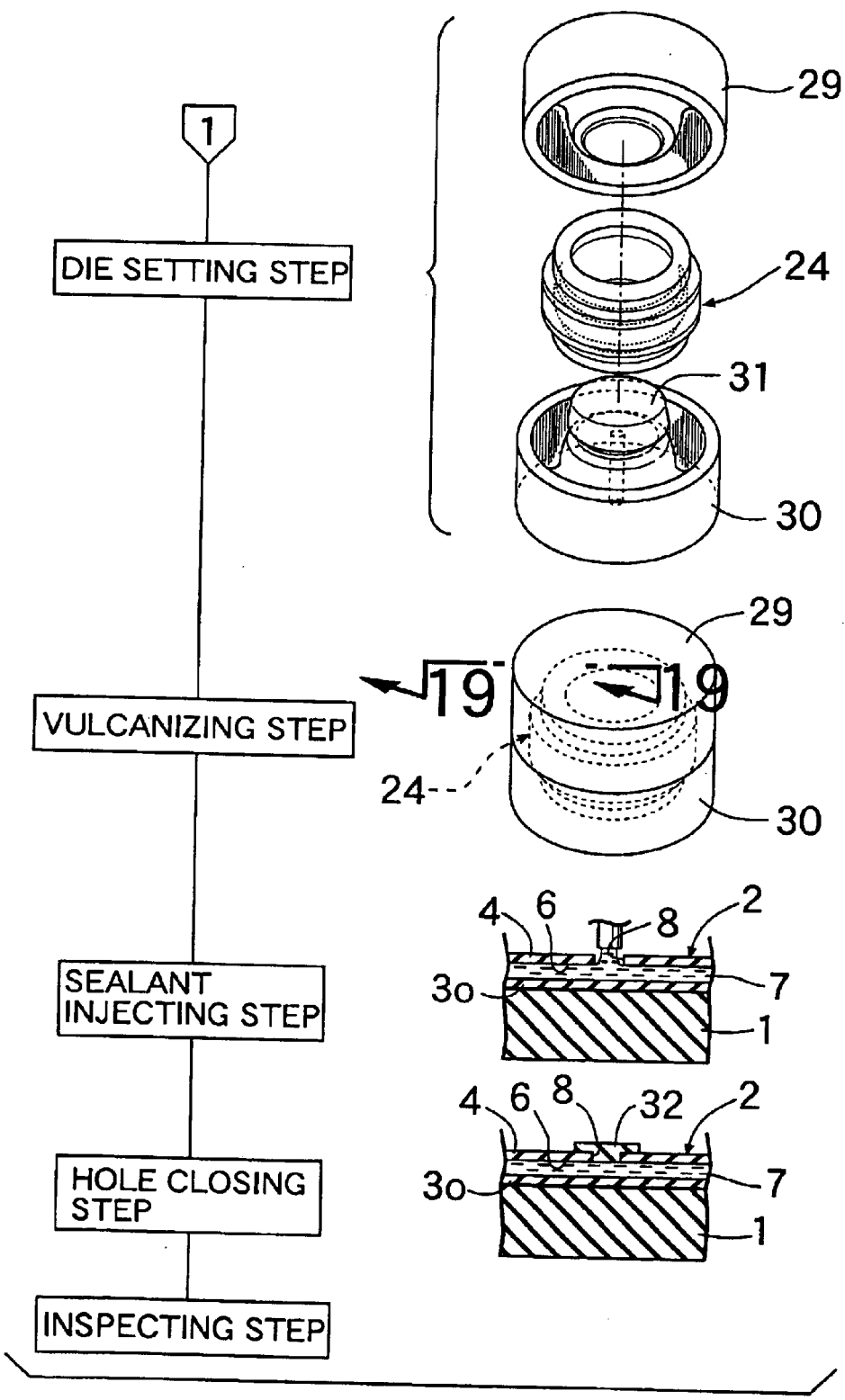

A manufacturing method for the tire T will now be described with reference to FIGS. 14 and 15.

The manufacturing method for the tire T includes a material kneading step, inner liner extrusion molding step, cutting step, cut-opening step, hole making step, joining step, liquid mold release agent injecting step, drum wrapping step, green tire molding step, die setting step, vulcanizing step, sealant injecting step, hole closing step, and inspecting step.

A material kneaded in the material kneading step is extrusion-molded in the inner liner extrusion molding step to mold the inner liner 2 of raw rubber. The inner liner 2 is integrally comprised of a sealant chamber peripheral wall forming a peripheral wall 3 (see FIG. 13), a pair of air chamber peripheral walls 3i, 3i and a partition wall 4. The sealant chamber peripheral wall 3o and the partition wall 4 are connected to form a sectionally circular shape, and the pair of air chamber walls 3i, 3i are connected to a connecting portion. In the next cutting step, the inner liner 2 is cut into a given length. In the next hole making step, an injection hole 8 is opened through the partition wall 4 of the inner liner 2.

Figure 16:
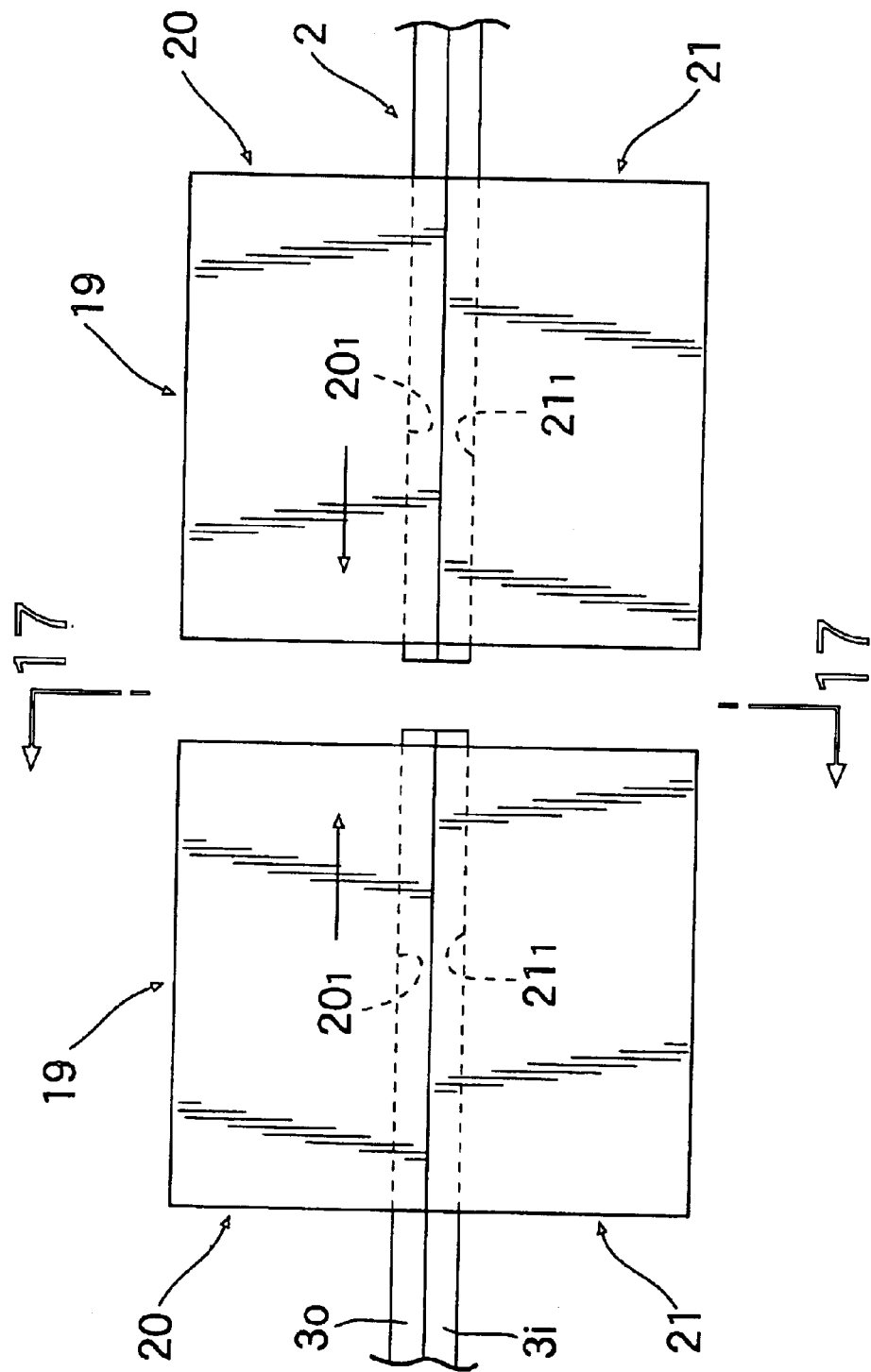
Figure 17:
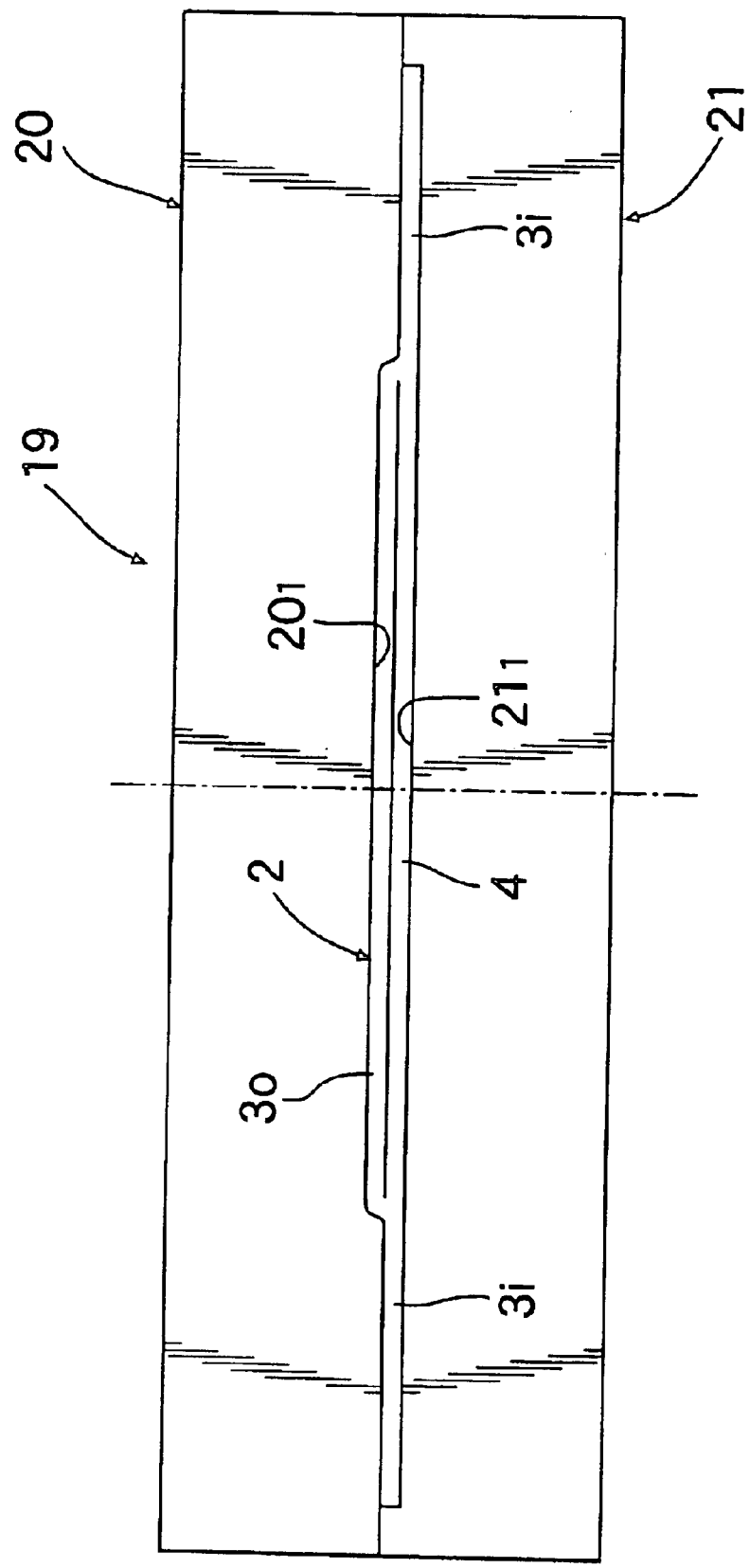

In the next joining step, the opposite end portions of the inner liner 2 cut in the cutting step are joined together to form an annular shape. As shown in FIGS. 16 and 17, the cut opposite end portions of the inner liner 2 are held by a pair of holders 19 to be jointed to each other. Each holder 19 is comprised of an upper die 20 and a lower die 21 which are capable of being relatively opened and closed. The upper die 20 and the lower die 21 have opposed surfaces formed with holding surfaces $20_1$ and $21_1$ of shallow recess shape, respectively, to hold the inner liner 2 in a flatly compressed state. The sealant chamber peripheral wall 3o of the inner liner 2 is fitted with the holding surface $20_1$ of the upper die 20, and the air chamber peripheral walls 3i, 3i and the partition wall 4 of the inner liner 2 are fitted with the holding surface $21_1$ of the lower die 21.

In the next liquid mold release agent injecting step, a liquid mold release agent 9 is injected from the injection hole 8 of the partition wall 4 of the inner liner 2 into the sealant chamber 6. In the next drum wrapping step, the annular inner liner 2 having the liquid mold release agent 9 contained in the sealant chamber 6 in the liquid mold release agent injecting step is fitted around the outer circumference of a drum 23. In the next green tire molding step, each component of the tire body 1 is wrapped around the outer circumference of the inner liner 2 to form a green tire 24.

Figure 18:
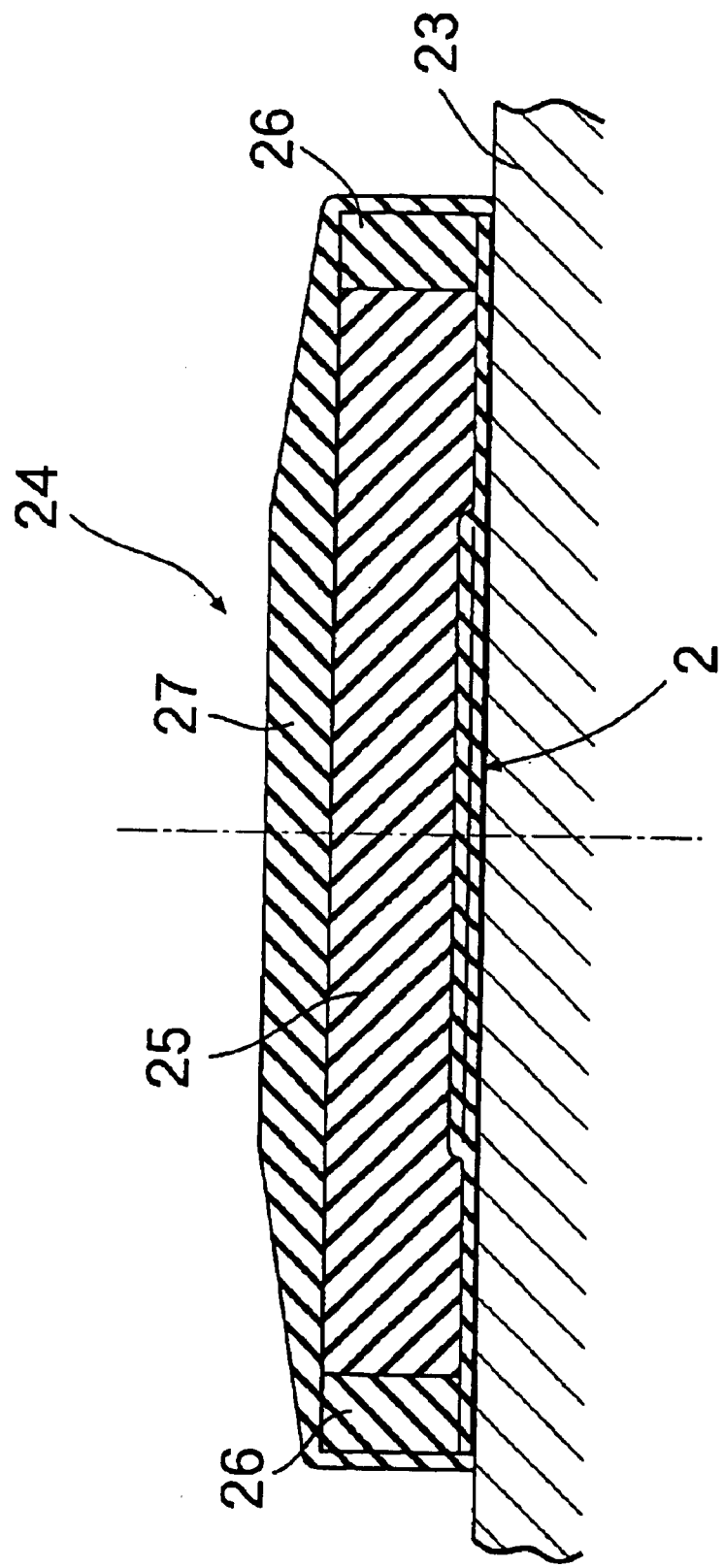

As shown in FIG. 18, the green tire 24 is comprised of a cord portion 25 wrapped around the radially outside of the inner liner 2, a pair of bead portions 26, 26 fitted with the drum 23 so as to be joined with the axially opposite ends of the cord portion 25, and a tread portion 27 wrapped around the radially outside of the cord portion 25 and the bead portions 26 so as to cover them.

In the die setting step, the green tire 24 removed from the drum 23 is set between an upper die 29 and a lower die 30 for vulcanization and forming. In the vulcanizing step as shown in FIG. 19, the upper die 29 and the lower die 30 are heated, and a pressure bag 31 placed inside the green tire 24 is expanded by air pressure to thereby bring the green tire 24 into pressure contact with the forming surfaces of the upper die 29 and the lower die 30, thus vulcanizing and forming the green tire 24 into a final product shape.

At this time, the sealant chamber peripheral wall 3o and the partition wall 4 of the inner liner 2 are sandwiched under pressure between the pressure bag 31 and the tire body 1. However, since the liquid mold release agent 9 is adhered between the contact surfaces of the sealant chamber peripheral wall 3o and the partition wall 4, these walls 3o and 4 are not bonded to each other by vulcanization. On the other hand, the contact surfaces of the sealant chamber wall 3o and the tire body 1 to which the liquid mold release agent 9 is not adhered, and the contact surfaces of the air chamber peripheral walls 3i, 3i, and the tire body 1 are bonded to each other by vulcanization. Furthermore, even when the inner liner 2 is expanded in vulcanizing and forming it, the liquid mold release agent 9 having fluidity easily spreads over the contact surfaces of the sealant chamber peripheral wall 3o and the partition wall 4, thereby obviating the possibility of bonding of the contact surfaces of the sealant chamber peripheral wall 3o and the partition wall 4 by vulcanization. Accordingly, the sealant chamber 6 defined between the sealant chamber peripheral wall 3o and the partition wall 4 can be formed into a proper shape.

Figure 19:
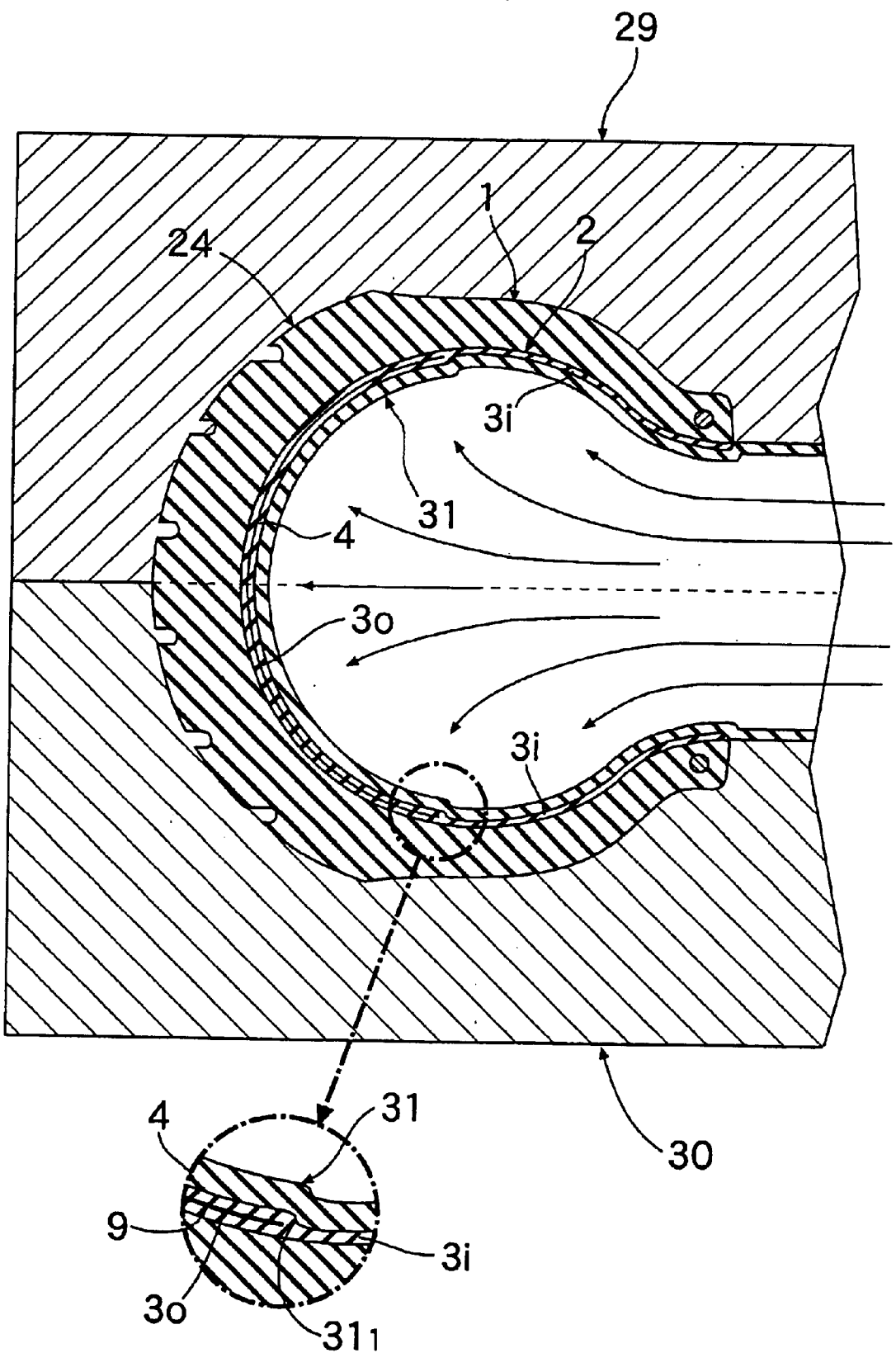

The total thickness of the sealant chamber peripheral wall 3o and the partition wall 4 of the inner liner 2 is larger than the thickness of each of the air chamber peripheral walls 3i, 3i, so that steps are generated at the opposite ends of the partition wall 4 (see an enlarged encircled portion in FIG. 19). To absorb the above-described steps, the outer surface of the pressure bag 31 is formed with a step portion $31_1$, thereby pressing the sealant chamber peripheral wall 3o, the partition wall 4, and the air chamber peripheral walls 3i, 3i to the inner surface of the tire body 1 under a uniform pressure.

After the vulcanizing step, the tire body 1 and the inner liner 2 integrated together are removed from the upper and lower dies. In the next sealant injecting step, the sealant 7 is injected from the injection hole 8 of the partition wall 4 into the sealant chamber 6. In the next hole closing step, an adhesive tape 32 is attached to the injection hole 8, thus completing the tire T. In the final inspecting step, the tire T completed is inspected to terminate all the steps.

Figure 20:
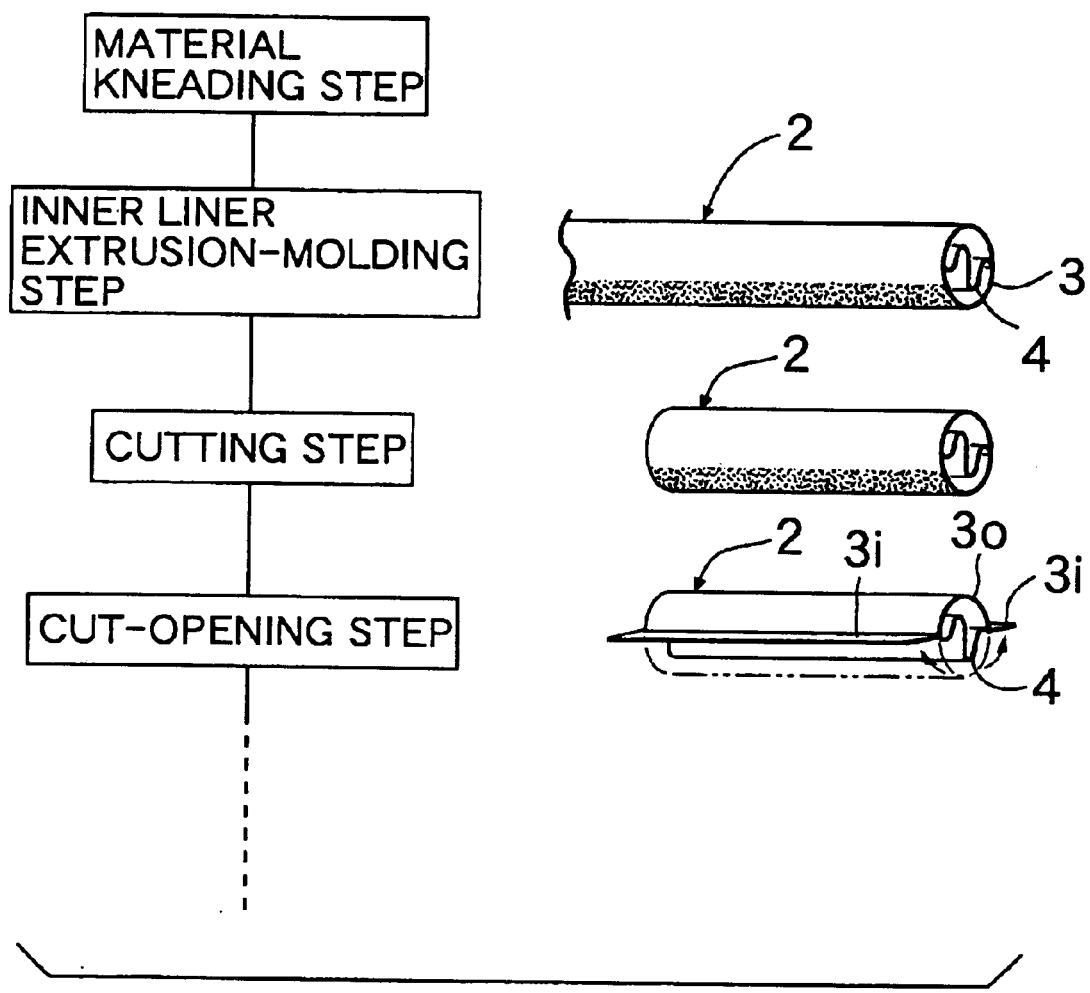
FIG. 20 is a view similar to FIG. 14, showing a second method of forming a sealant chamber by using a liquid mold release agent.

A second method of forming a sealant chamber by using a liquid mold release agent will now be described with reference to FIG. 20.

This method is characterized in the shape of an inner liner 2 extrusion-molded in the inner liner extruding step. More specifically, the inner liner 2 integrally has a sectionally circular peripheral wall 3 and a sectionally S-shaped partition wall 4 dividing the peripheral wall 3 into two parts. In the next cutting step, the inner liner 2 is cut into a given length. In the next cut-opening step, the peripheral wall 3 of the inner liner 2 is cut in its longitudinal direction to thereby form a sealant chamber peripheral wall 3o and a pair of air chamber peripheral walls 3i, 3i. The subsequent steps are similar to those of the first method mentioned above.

In the second method of forming a sealant chamber by using a liquid mold release agent, the inner liner 2 includes a sealant chamber 6 of a bag-shape which is defined by the sealant chamber peripheral wall 3o and the partition wall 4. Alternatively, the sealant chamber 6 may be defined between the inner liner 2 and the inner surface of the tire body 1 by bonding the opposite side edges of a sheet-formed inner liner to the inner surface of the tire body 1 by vulcanization. In this case, the vulcanizing step may be carried out in the state in which the inner liner 2 is superposed onto the inner surface of the tire body 1, while the liquid mold release agent 9 is preliminarily applied to a portion of the inner liner facing to the sealant chamber 6.

What is claimed is:

1. A sealant-incorporated tire manufacturing method comprising the steps of superimposing an inner liner onto an inner surface of a tire body prior to vulcanization and bonding at least a part of said inner liner to the inner surface of said tire body by vulcanization to define an annular sealant chamber by said inner liner inside a tread of said tire body, in which a mold release sheet having a mold releasing property are placed on a portion of said inner liner facing to said sealant chamber prior to vulcanization, wherein at least a part of one surface of said mold release sheet has the mold releasing property, and in the vulcanization step, a part of said mold release sheet which has no mold releasing property is bonded to a wall surface of said sealant chamber by vulcanization.

2. A sealant-incorporated tire manufacturing method comprising the steps of superimposing an inner liner onto an inner surface of a tire body prior to vulcanization and bonding at least a part of said inner liner to the inner surface of said tire body by vulcanization to define an annular sealant chamber by said inner liner inside a tread of said tire body, in which a mold release sheet having a mold releasing property are placed on a portion of said inner liner facing to said sealant chamber prior to vulcanization, wherein a plurality of mold release sheets are laminated one on another.

3. A sealant-incorporated tire manufacturing method comprising the steps of superimposing an inner liner onto an inner surface of a tire body prior to vulcanization and bonding at least a part of said inner liner to the inner surface of said tire body by vulcanization to define an annular sealant chamber by said inner liner inside a tread of said tire body, in which a mold release sheet having a mold releasing property are placed on a portion of said inner liner facing to said sealant chamber prior to vulcanization, wherein said mold release sheet is folded into a corrugated shape prior to vulcanization, and said mold release sheet is expanded in the vulcanization step.

* * * * *